United States Patent
Ueno et al.

(10) Patent No.: US 8,458,379 B2
(45) Date of Patent: Jun. 4, 2013

(54) INFORMATION PROCESSING PROGRAM, METHOD, AND TRANSFER PROCESSING DEVICE

(75) Inventors: Hitoshi Ueno, Kawasaki (JP); Masaaki Takase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 21 days.

(21) Appl. No.: 13/344,731

(22) Filed: Jan. 6, 2012

(65) Prior Publication Data
US 2012/0239831 A1     Sep. 20, 2012

(30) Foreign Application Priority Data
Mar. 18, 2011 (JP) ................................. 2011-061795

(51) Int. Cl.
*G06F 13/00* (2006.01)
*G06F 3/00* (2006.01)

(52) U.S. Cl.
USPC ............. 710/33; 710/2; 710/5; 710/8; 710/15

(58) Field of Classification Search
None
See application file for complete search history.

(56) References Cited

U.S. PATENT DOCUMENTS
2006/0271700 A1   11/2006   Kawai et al.
2007/0083727 A1*   4/2007   Johnston et al. .............. 711/170

FOREIGN PATENT DOCUMENTS
| JP | 09-231184 A | 9/1997 |
|---|---|---|
| JP | 2000-010936 A | 1/2000 |
| JP | 2004-520641 A | 7/2004 |
| JP | 2006-332825 A | 12/2006 |
| WO | WO-02/25440 A2 | 3/2002 |

* cited by examiner

*Primary Examiner* — Scott Sun
(74) *Attorney, Agent, or Firm* — Fujitsu Patent Center

(57) ABSTRACT

An information processing method includes calculating a reception estimated time when the data are received based on a last reception time of the data and a reception time interval of the data for transfer source devices; calculating a shift completion estimated time based on a shift time period necessary to shift an assignment of a data transfer process of a transfer source device of the plurality of the transfer source devices from the transfer processing device to another transfer processing device; and transferring the assignment of the data transfer process from the transfer processing device to the another transfer processing device, the assignment of the data transfer process being relevant to a transfer source device having the calculated reception estimated time later than the shift completion estimated time and closer to the shift completion estimated time than any other transfer source devices.

13 Claims, 24 Drawing Sheets

FIG.5

| IP ADDRESS OF SERVING DEVICE | TRANSFER AMOUNT IN PREVIOUS TIME | TRANSFER AMOUNT IN NEXT TO LAST | SHIFT STATUS |
|---|---|---|---|
| 10.0.0.1 | 2MB | 2MB | ABLE TO SHIFT |
| 10.0.0.2 | 3MB | 1MB | UNABLE TO SHIFT |
| 10.0.0.3 | 1MB | 1MB | ABLE TO SHIFT |

| VM IDENTIFIER | IP ADDRESS OF COLLECTING DEVICE |
|---|---|
| vm0001 | 20.0.0.1 |
| vm0002 | 20.0.0.1 |
| vm0003 | 20.0.0.2 |
| vm0004 | 20.0.0.3 |

| TRANSFER AMOUNT FLUCTUATION THRESHOLD VALUE | UPS USAGE RATE THRESHOLD VALUE |
|---|---|
| 500KB | 50% |

FIG.8

| IP ADDRESS OF SERVING DEVICE | SESSION ID |
|---|---|
| 10.0.0.1 | aabcc12 |
| 10.0.0.2 | fffggkk11 |
| 10.0.0.3 | affvtghh4 |
| 10.0.0.4 | sserzlt22 |

FIG.9

| IP ADDRESS OF SERVING DEVICE | LAST RECEPTION TIME | AVERAGE RECEPTION TIME INTERVAL | AVERAGE RECEPTION TIME INTERVAL FLUCTUATION VALUE |
|---|---|---|---|
| 10.0.0.1 | 5:10 '30 | 1m10sec | 2sec |
| 10.0.0.2 | 5:10 '45 | 1m13sec | 1sec |
| 10.0.0.3 | 5:10 '50 | 1m00sec | 3sec |
| 10.0.0.4 | 5:10 '55 | 1m20sec | 0sec |

| IP ADDRESS OF TRANSFER PROCESSING DEVICE | CPU USAGE RATE | LARGE FLUCTUATION CPU USAGE RATE |
|---|---|---|
| 100.0.0.1 | 70% | 20% |
| 100.0.0.2 | 50% | 0% |
| 100.0.0.3 | 60% | 40% |

| IP ADDRESS OF TRANSFER PROCESSING DEVICE | IP ADDRESS OF SERVING DEVICE |
|---|---|
| 100.0.0.1 | 10.0.0.1 |
| 100.0.0.1 | 10.0.0.2 |
| 100.0.0.1 | 10.0.0.3 |
| 100.0.0.1 | 10.0.0.4 |
| 100.0.0.2 | 10.0.0.5 |
| 100.0.0.2 | 10.0.0.6 |
| 100.0.0.2 | 10.0.0.7 |
| 100.0.0.2 | 10.0.0.8 |

| IP ADDRESS OF SERVING DEVICE | VM IDENTIFIER | IP ADDRESS OF COLLECTING DEVICE |
| --- | --- | --- |
| 10.0.0.1 | vm0001 | 20.0.0.1 |
| 10.0.0.1 | vm0002 | 20.0.0.1 |
| 10.0.0.2 | vm0003 | 20.0.0.2 |
| 10.0.0.2 | vm0004 | 20.0.0.3 |

| CPU USAGE RATE UNCONDITIONAL ASSIGN THRESHOLD VALUE | CPU USAGE RATE CONDITIONAL ASSIGN THRESHOLD VALUE | LARGE FLUCTUATION CPU USAGE RATE THRESHOLD VALUE |
| --- | --- | --- |
| 60% | 70% | 50% |

INFORMATION PROCESSING PROGRAM, METHOD, AND TRANSFER PROCESSING DEVICE

CROSS-REFERENCE TO RELATED APPLICATION

This application is based upon and claims the benefit of priority of Japanese Patent Application No. 2011-061795, filed Mar. 18, 2011. The entire contents of which are incorporated herein by reference.

FIELD

The embodiment discussed herein is related to a technique of load distribution in information processing.

BACKGROUND

There have been proposed various techniques to properly perform the load distribution in a system where information processings are distributed to plural processing mechanisms. In the distribution processes, not only the information processing may be assigned but also the assignment may be shifted (transited) depending on the operational state of the system.

As an example of the load distribution technique, in a system where plural information processing sections perform information processings which are distributed, a technique is employed where an agent selects the information processing section having a low operating rate and assigns a processing request to the selected information processing section. In this technique, the information processing section transmits a reassignment request for reassigning the processing request to the agent based on the processing state of the information processing section. Upon receipt of the reassignment request, the agent transfers a processing request managed by another information processing section to the information processing section transmitted the reassignment request.

As another example, in an object-oriented client-server system, the load states of the servers are managed, and based on the load states, a server object is transferred to the server having less load. Further, there has been proposed another technique in which, in distributed platforms, when an application is executed, the application and the like are distributed based on a predetermined algorithm.

Further, there has been proposed another technique in which when a request from a client is assigned (transferred) to any of a plurality of data centers on a network, the request is preferentially assigned to a data center having less processing delay time determined based on the position of the data centers and the communication routes to the data centers.

FIG. 1 illustrates a specific example of a load distribution system including a plurality of transfer processing devices transferring data to a predetermined transfer destination device, the data being transmitted from the transfer source device of the data. In FIG. 1, in transfer source devices 802 which are sources to transfer data, corresponding Virtual Machines (VM) are configured. The transfer source device 802 extracts VM statistical information relative to one or more VMs every predetermined cycle, the VMs operating in the transfer source device 802. Further, the transfer source device 802 transmits the extracted VM statistical information to a distributing device 806. The distributing device 806 serves as a so-called load balancer. Namely, the distributing device 806 transmits the received VM statistical information to one transfer processing device 804 that assigns the process of the VM statistical information of the transfer source device 802 from among a plurality of the transfer processing devices 804. The transfer processing devices 804 separates the VM statistical information for each of the VMs, and distributes and transmits the VMs to the respective transfer processing devices 804. The transfer processing devices 804 perform statistical processing for each of users who are the supply targets of the VMs. Further, a transfer management device 805 manages an assignment state in a data transfer process of the transfer source device 802 corresponding to the transfer processing devices 804.

In this example of the load distribution system, depending on the processing states of the transfer processing devices 804, the assignments of the data transfer process of the transfer source device 802 is shifted from one transfer processing device 804 to another transfer processing device 804.

For related art, reference may be made to Japanese Laid-open Patent Application No. 09-231184, Japanese Laid-open Patent Application No. 2000-10936, and Japanese Laid-open Patent Application No. 2004-520641.

SUMMARY

According to an aspect, a transfer processing device transferring data transmitted every predetermined time period from a plurality of transfer source devices to corresponding transfer destination devices, or a transfer management device included in a system including a plurality of the transfer processing devices and one or more transfer management devices, performs the processes including calculating a reception estimated time when the data are to be received based on a last reception time of the data and a reception time interval of the data for each of the plurality of the transfer source devices; calculating a shift completion estimated time based on a shift time period which is necessary to shift an assignment of a data transfer process of a transfer source device of the plurality of the transfer source devices from the transfer processing device to another transfer processing device; and transferring the assignment of the data transfer process from the transfer processing device to the another transfer processing device, the assignment of the data transfer process being relevant to a transfer source device having the calculated reception estimated time later than the shift completion estimated time and closer to the shift completion estimated time than any other transfer source devices.

The objects and advantages of the embodiments disclosed herein will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 5 illustrates an example serving device management table;

FIG. 6 illustrates an example transfer destination table;

FIG. 7 illustrates an example common information table;

FIG. 8 illustrates an example session management table;

FIG. 9 illustrates an example transfer time table;

FIG. 12 illustrates an example transfer processing device management table;

FIG. 13 illustrates an example of an assignment table;

FIG. 14 illustrates an example transfer destination table;

FIG. 15 illustrates an example common information table;

DESCRIPTION OF EMBODIMENT

Figure 1:
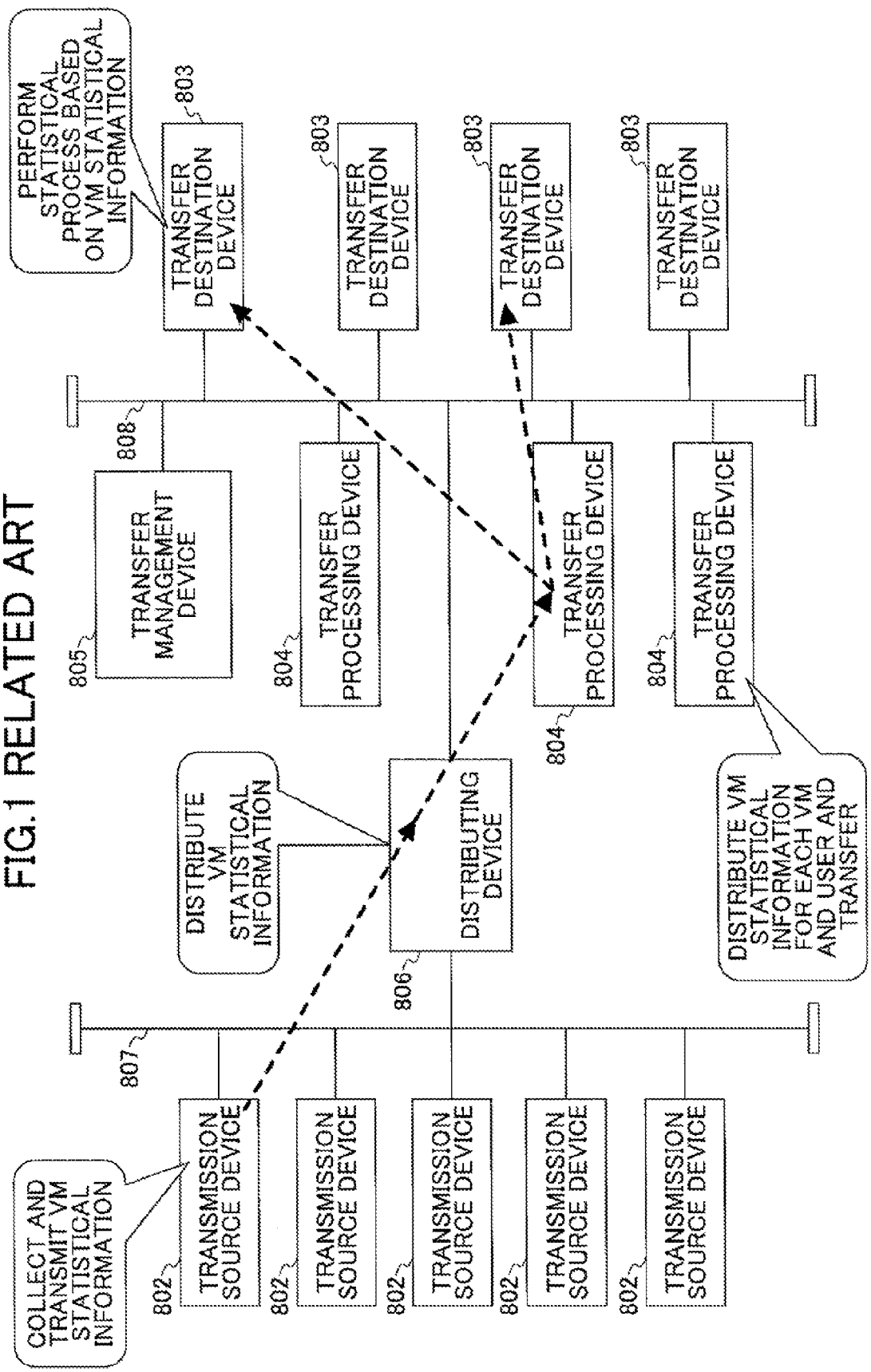
FIG. 1 illustrates an example of an entire system configuration.

For example, in the load distribution system as illustrated in FIG. 1, the transfer source devices 802 which are the transmission source of the VM statistical information are assigned to the respective transfer processing devices 804. Further, the distributing device 806 distributes the VM statistical information from the transfer source devices 802. Upon receiving the VM statistical information from the transfer source device 802, the transfer processing device 804 performs the following processes. Namely, first, the transfer processing device 804 analyzes the texts of the received VM statistical information from the header portion. In this process, the processing load of the transfer processing device 804 depends on the amount of text data of the VM statistical information. Further, the transfer processing device 804 divides the received VM statistical information for each of the VMs, and distributes and transmits the VMs to the corresponding transfer destination devices 803 which perform a statistical processing and the like for each of the users who are the supply targets of the VMs. In this process, the processing load of the transfer processing device 804 depends on the number of VMs included in the VM statistical information and the number of users as the distribution targets.

In this case, in principle, the distribution of the VM statistical information of the transfer source devices 802 corresponding to the transfer processing devices 804 (i.e., the assignment of the data transfer process of the transfer source devices 802) is evenly performed. Therefore, the processing loads may be somewhat balanced (may not be remarkably biased) among the transfer processing devices 804. However, for example, when the number of accesses to the VM working on the transfer source device 802 varies, the access logs and the data amount of the VM statistical information may fluctuate. Further, due to the variance of the number of VMs, the data amount of the VM statistical information may fluctuate. Further, for example, when a failure occurs in the transfer processing device 804 or a communication failure occurs between the transfer source device 802 and the transfer processing device 804, the VM statistical information accumulated during the failure may be collectively transmitted after the failure is recovered. Due to the factors of the load fluctuation such as above, the processing loads among the transfer processing devices 804 may be biased. Further, when the processing load of a specific transfer processing device 804 is increased, the process of the VM statistical information in the specific transfer processing device 804 may not be completed in a prescribed time period. As a result, the usage efficiency of the VM statistical information may be reduced. In such a case, for example, it may become difficult to collect the VM statistical information in real time, which may cause, for example, a delay in responding to the users when the quality of the services provided for the users is degraded.

Therefore, in the specific example of the load distribution system, the assignments of the data transfer process of the transfer source device corresponding to the transfer processing device is shifted (transited) from one transfer processing device to another transfer processing device depending on the processing states of the transfer processing devices.

However, in such a load distribution system, in a case where the shift process of the assignment is performed, if an appropriate transfer source device 802 as a shift target is not selected, process efficiency of the whole system may not be effectively improved. Further, the load distribution system of related art may not include a specific configuration to select an appropriate assignment of the information processing to be shifted. Namely, an appropriate target is not always selected in the selection of a target to be shifted.

Here, a technique according to an embodiment described herein may be applied to, for example, a system having a configuration where the data are (unilaterally) transmitted from the transfer source device to the transfer processing device and may not be applied to a system employing a fetch method in which the transfer processing device transmits a request to the transfer source device so as to acquire the data from the transfer source device. In such a system configuration, the transfer processing device may not control the timing when the transfer source device transmits the data. Because of this feature, when the transfer source device is reassigned to the another transfer processing device, the reception of the data from the transfer source device determined as the shift target may be started before the assignment (reassignment) of the shift process is completed. Therefore, in this technique of an embodiment, when determining upon reassignment from one transfer source device to another transfer source device, a reception estimated time indicating when the data will be received is calculated for each of the transfer source devices. Further, a shift completion estimated time indicating when the transfer process of the assignment will be completed is also calculated. Further, a transfer source device having the time data indicating when the data are to be received (i.e., the reception estimated time) later than the time data indicating when the shift process of the assignment is completed (i.e., the shift completion estimated time) (so that, the next data are received after the shift process of the assignment is completed) and having the reception estimated time closest to the shift completion estimated time than any other transfer source devices is selected as the shift target.

By doing in this way, it may become possible to select an appropriate transfer source device assigned to the transfer source device to be switched and reduce the probability of occurring a failure that the reception of data from the transfer source device determined as the shift target is started before the shift process of the assignment is completed. In addition, the transmission process of the data to be received earlier is shifted to another transfer source device, the load reduction of the transfer source device may be effectively and promptly realized. Therefore, it may become possible to improve the accuracy of the shift process of the assignment and ensure the performance of the shift process, rendering the shift process more effective. Accordingly, as a whole system, it may become possible to effectively use the information processing resources of a plurality of scale-out transfer processing devices and effectively perform the transfer process of the data.

In the following, a preferred embodiment of a technique is described in which the assignment of the data transfer process is switched from one transfer processing devices to another transfer processing devices.

Next, a preferred embodiment is described with reference to accompanying drawings. In this embodiment, similar to the system providing VMs to the users and configured in a server node pool as described above, a case is described where a system provides the VM statistical information which is various information related to the operating states of the VMs to the users. Specifically, in the system described below, the transfer processing device transfers the VM statistical information to a collecting device (transfer destination device), the VM statistical information being generated by a serving device (transfer source device) which is a server where the VM is configured, the collecting device being a server collecting the VM statistical information. The VM statistical information includes various information items including, for example, a usage state of a physical resource assigned to the VM. Further, the VM statistical information is to be provided to visualize the content of the services for the users. Further, a purpose of introducing the transfer processing device and performing the transfer process on the VM statistical information by the transfer processing device is to separate the process from the serving devices, the process being to distribute the VM statistical information of the serving devices to appropriate collecting devices corresponding to the users who are the supply destinations of the VMs. By separating the process in this way, even when the number of the VMs configured in the serving devices and the number of the users are increased, it may become possible to effectively distribute the VM statistical information to the collecting devices without increasing the loads (workloads) of the serving devices. Further, it may become possible to flexibly respond to the change of the system configuration such as the change of the arrangement of the VMs, the replacement of the collecting devices and the like.

[Entire System Configuration]

Figure 2:
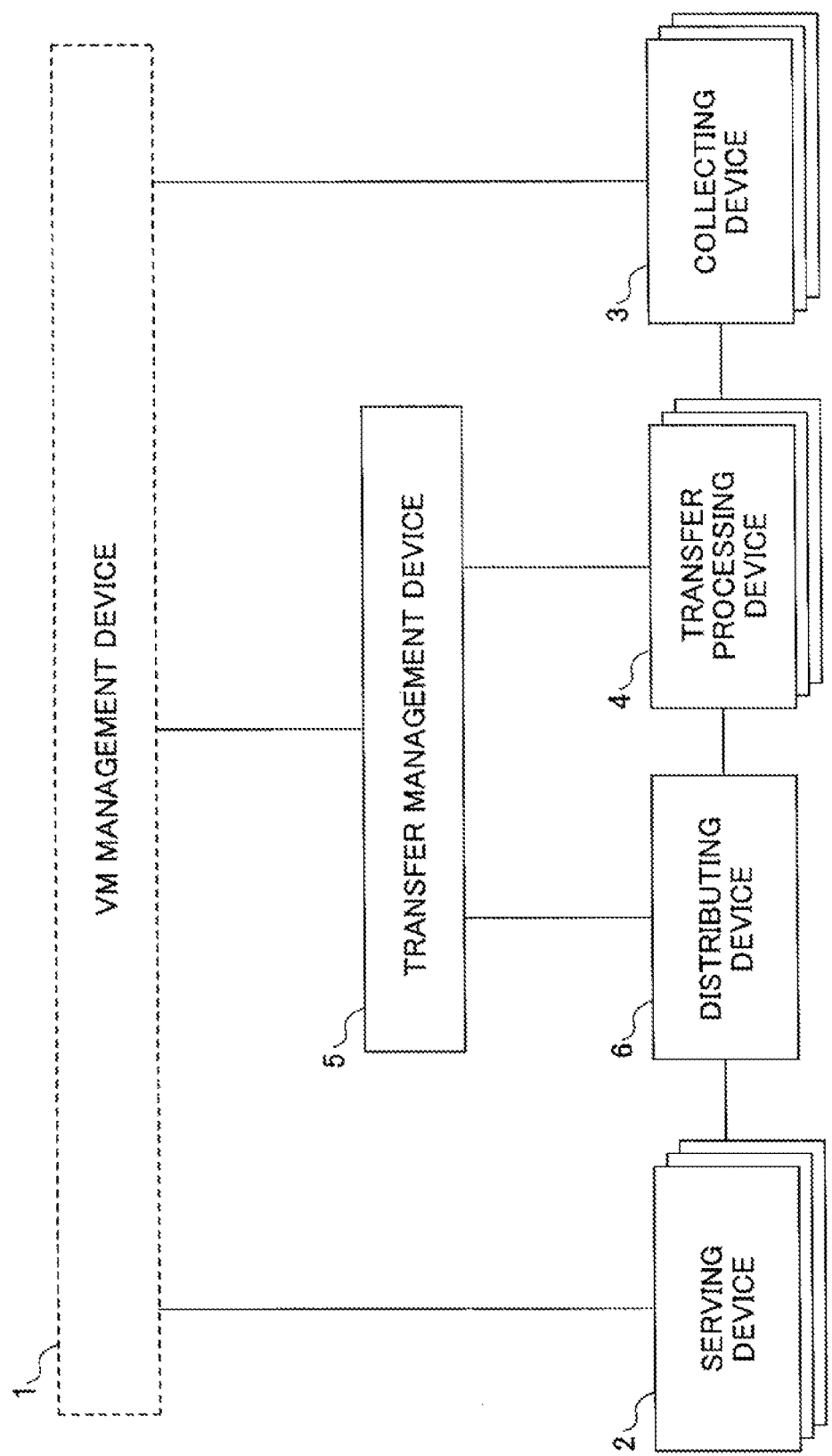
FIG. 2 illustrates another example of the entire system configuration.

FIG. 2 schematically illustrates an entire system configuration according to an embodiment. As illustrated in FIG. 2, the system includes a VM management device 1, serving devices 2, collecting devices 3, transfer processing devices 4, a transfer management device 5, and a distributing device 6. Those VM management device 1, serving devices 2, collecting devices 3, a transfer management device 5, and a distributing device 6 are information processing devices including a CPU (Central Processing Unit) and a storage. Herein, the storage refers to at least one of a volatile storage such as a memory and a non-volatile storage such as a storage device.

The VM management device 1 communicates with an external user's system (not shown) and the serving devices 2. Further, the VM management device 1 configures the VM in the serving device 2 in response to a request from the user's system. Further, the VM management device 1 transmits system configuration information to the transfer management device 5, the system configuration information including a relationship between the serving devices 2 where the VMs are configured and the collecting devices 3 which are the transfer destinations of the VM statistical information. In this case, even when, for example, the system configuration is changed by adding the serving device 2 and the collecting device 3, the VM management device 1 transmits the system configuration information including the updated information to the transfer management device 5.

In the serving device 2, the VM is configured based on the control by the VM management device 1 in response to the request from the user's system. Further, in the serving device 2, an agent extracting the VM statistical information every a predetermined time period is operated, the VM statistical information being related to the VM configured in the serving device 2. Further, the agent operating in the serving device 2 transmits the extracted VM statistical information to the distributing device 6 by generating an HTTP (Hypertext Transfer Protocol) connection. Further, in the following, the process performed by the agent in the serving device 2 may be simplified and described as the process performed by the serving device 2. Further, in the following descriptions, instead of using the IP address of the serving device 2, an agent ID, which is an identifier uniquely specifying the agent in the entire system, may be used.

In the collecting device 3, an application operates providing the VM statistical information to the user. Namely, the collecting devices 3 receive and collect the VM statistical information transmitted from the transfer processing devices 4 and, when necessary, perform statistical processing on the VM statistical information using an application or the like. Then, the transfer processing devices 4 output the VM statistical information and the result of the statistical processing to the user's system when available. Further, the collecting devices 3 may be included in the user's system.

The transfer processing device 4 receives the VM statistical information from the serving devices 2 via the distributing device 6, and transfers the received VM statistical information to the collecting devices 3. The VM statistical information includes information relating to one or more VMs. The transfer processing device 4 receives, for example, information indicating the relationship between the VMs and the collecting devices 3 which are the transfer destinations of the VM statistical information, and stores the received information in a storage of the transfer processing device 4. Further, upon receiving the VM statistical information from the serving devices 2, the transfer processing device 4 separates (divides) the VM statistical information for each of the VMs, and then, sorts the separated VM statistical information into categories corresponding to the collecting devices 3, and transmits the sorted VM statistical information to the corresponding collecting devices 3. In this case, when determining that the workload of the transfer processing device 4 is or is expected to become large, the transfer processing device 4 selects a serving device 2 from among the serving devices 2 which are currently assigned to the transfer processing device 4, the assignment of which is to be shifted to another transfer processing device 4. Then, the transfer processing device 4 transmits an assignment shift request to the transfer management device 5, the assignment shift request requesting for shift the assignment of the data transfer process of the selected serving device 2, so as to shift the assignment of the data transfer process of the selected serving device 2. Further, in the following, the assignment of the data transfer process of the serving device 2 to the transfer processing device 4 may be simplified.

The transfer management device 5 manages the entire transfer process of the VM statistical information. The transfer management device 5 receives the system configuration information from the VM management device 1 and reports the information indicating, for example, the relationship between the VMs and the collecting devices 3 which are the transfer destinations of the VM statistical information to the transfer processing device 4. Further, upon receiving the assignment shift request requesting for shifting the assignment of the data transfer process of the selected serving device 2 from the transfer processing device 4, the transfer management device 5 determines a transfer processing device 4 as the shift target of the assignment. Then, the transfer management device 5 transmits a request to the distributing device 6, a request to set the change of the transfer processing device 4, which is determined as the shift target of the assignment, as determined by the distribution destination of the VM statistical information received from the serving devices 2.

The distributing device 6 serves as a so-called a load balancer that distribute the VM statistical information received from the serving devices 2 to the transfer processing devices 4 to which the data transfer processes of the serving devices 2 are assigned.

Figure 3:
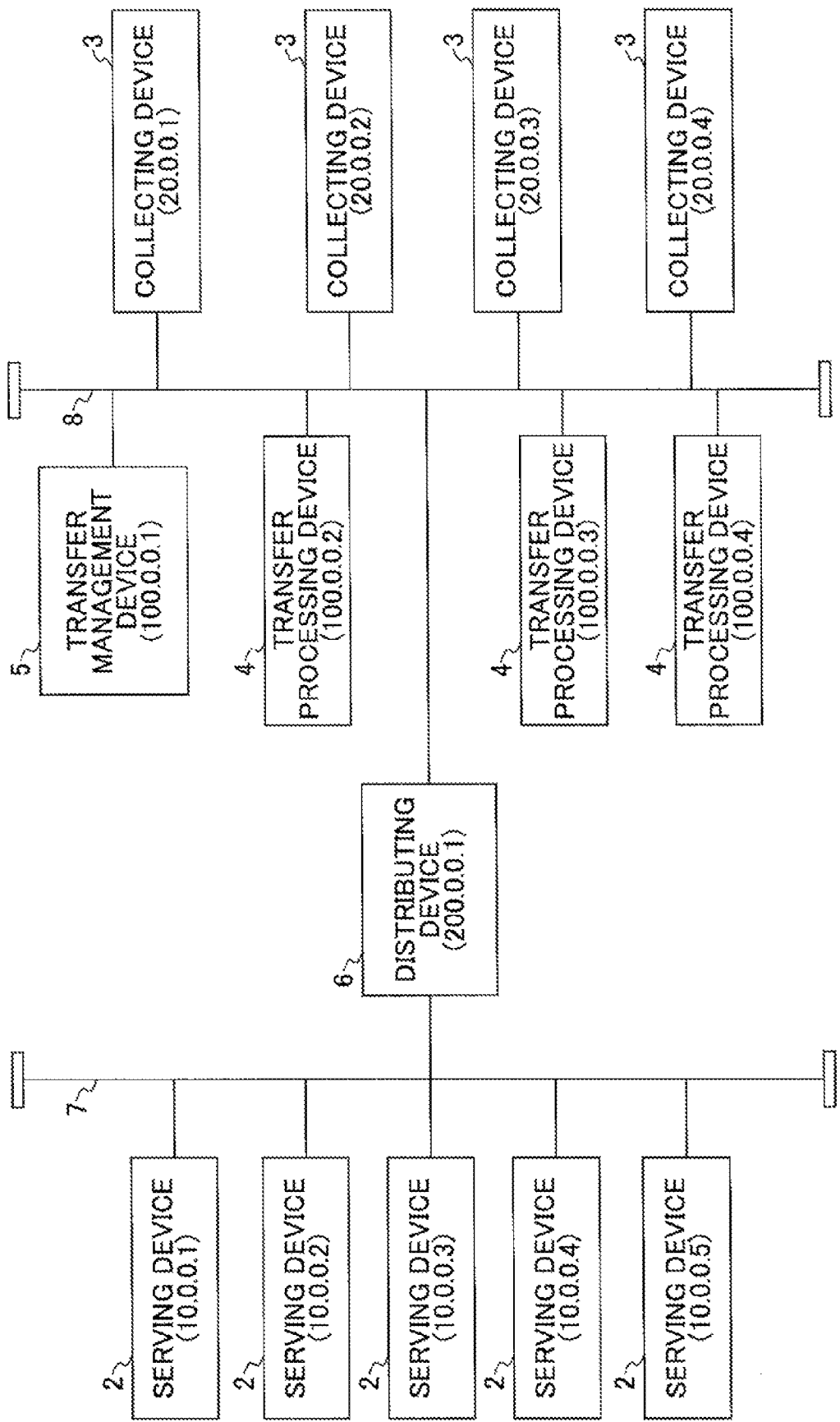
FIG. 3 illustrates an example of a part of the entire system configuration, the part including a serving device, a collecting device, and a transfer processing device.

FIG. 3 schematically illustrates a network topology among the serving devices 2, the collecting devices 3, the transfer processing devices 4, the transfer management device 5, and the distributing device 6. The IP addresses are assigned to the serving devices 2, the collecting devices 3, the transfer processing devices 4, the transfer management device 5, and the distributing device 6. Specifically, the serving devices 2 and the distributing device 6 are connected to each other via a network 7. The distributing device 6 is connected to another network 8. Besides the distributing device 6, the collecting devices 3, the transfer processing devices 4, and the transfer management device 5 are connected to each other via network 8.

Further, in this embodiment, the networks 7 and 8 among the devices are realized by the LAN (Local Area Network) connection. Further, the descriptions of the communicating devices such as a hub and a router are omitted. However, the networks are not limited to the LAN. For example, any appropriate means such as the WAN (Wide Area Network), the Internet or the like may be used to realize the networks. Further, the communications in the network may be wired communications or wireless communications. Further, the network topology illustrated in FIG. 3 is an example only. For example, the serving devices 2, the collecting devices 3, the transfer processing devices 4, the transfer management device 5, and the distributing device 6 may be connected to each other via a single network. Further, the numbers of the serving devices 2, the collecting devices 3, and the transfer processing devices 4 are an example only.

[Configurations of Transfer Processing Device and Transfer Management Device]

Figure 4:
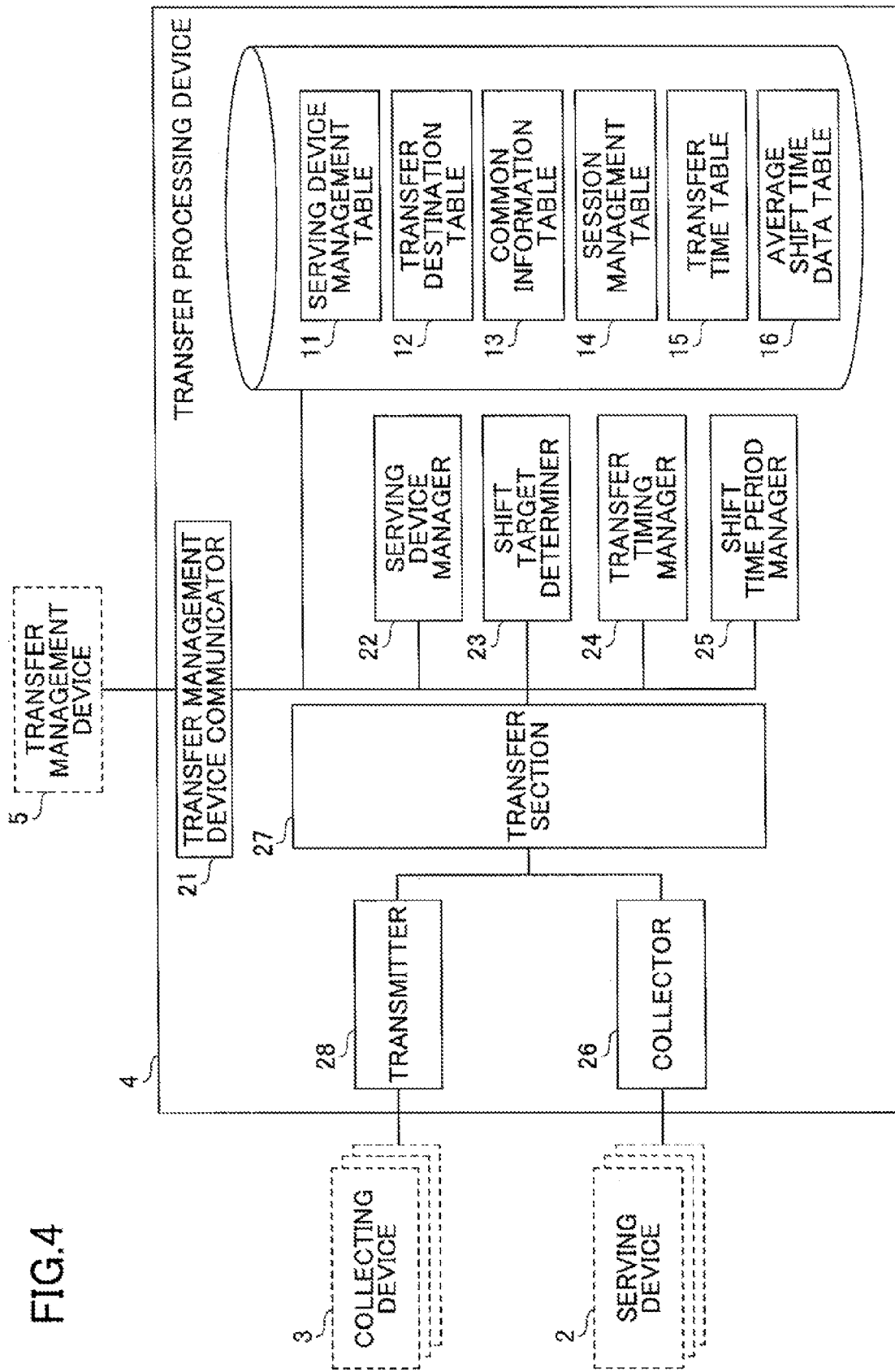
FIG. 4 is an example functional block diagram of the transfer processing device.

Next, example configurations of the transfer processing device 4 and the transfer management device 5 are described in detail. FIG. 4 is an example functional block diagram of the transfer processing devices 4. As illustrated in FIG. 4, the transfer processing devices 4 includes a serving device management table 11, a transfer destination table 12, a common information table 13, a session management table 14, a transfer time table 15, and an average shift time data table 16 in a storage (unit) of the transfer processing devices 4. The transfer processing devices 4 further includes a transfer management device communicator 21, a serving device manager 22, a shift target determiner 23, a transfer timing manager 24, a shift time period manager 25, a collector 26, and a transfer section 27, and a transmitter 28 as a control unit which is realized when corresponding program is loaded to the memory and executed by the CPU.

The serving device management table 11 stores various information related to the transfer process for each of the serving devices 2 assigned to the transfer processing devices 4. As illustrated in FIG. 5, the serving device management table 11 includes the "IP addresses" of the serving devices 2 assigned to a single transfer processing devices 4 (i.e., this transfer processing devices 4), the "transfer amount in previous time" which refers to the transfer amount of the VM statistical information in the previous transfer process in which the VM statistical information is transmitted from the serving devices 2 in a periodical VM statistical information collection process, and the "transfer amount in next to last" which refers to the transfer amount of the VM statistical information in next to last transfer process. Further, the serving device management table 11 further stores a "shift status" which refers to whether it is possible to transfer (change) the assignment of a transfer source device (i.e., the serving device 2) of a transfer processing device 4 to be assigned to another transfer processing device 4.

The transfer destination table 12 associates the VMs configured in the serving devices 2 assigned to the transfer processing device 4 with the collecting devices 3 which are the transfer destinations of the VM statistical information. As illustrated in FIG. 6, transfer destination table 12 includes a "VM identifier" that may specify the VM and the "IP address" of the collecting device 3.

The common information table 13 stores threshold values used in various determinations. As illustrated in FIG. 7, the common information table 13 includes a "transfer amount fluctuation threshold value" used to determine whether the fluctuation of the transfer amount of the VM statistical information is large or small, and a "CPU usage rate threshold value" used to determine whether the processing load of the VM statistical information is large or small.

The session management table 14 is used to manage the sessions in communications in which transfer target data are transmitted to the transfer processing device 4 from the serving devices 2 via the distributing device 6. As illustrated in FIG. 8, the session management table 14 includes the "IP address" of the serving device 2 and the "session ID" which is an identifier of the session.

The transfer time table 15 stores the data used to predict (estimate) the timing when the VM statistical information is received from the serving devices 2. As illustrated in FIG. 9, the transfer time table 15 includes the "IP address" of the serving device 2, a "final reception time (timing)" which refers to the time when the VM statistical information is received last from the serving device 2, an "average reception time interval" which refers to an (average) interval between the subsequent times when the VM statistical information is received, and an "average reception time interval fluctuation value" which indicates the fluctuation (fluctuation width) of the average reception time interval.

Figure 10:
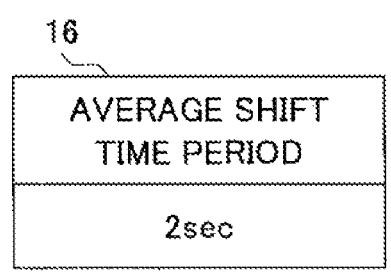
FIG. 10 illustrates an example average transfer time data.

The average shift time data table 16, as illustrated in FIG. 10, refers to the time (time span) necessary for (performing) the process of shifting the assignment of the serving device 2. Namely, the average shift time data table 16 refers to time necessary to perform the shift (switching) of the distribution destination of the VM statistical information in the distributing device 6.

The transfer management device communicator 21 transmits and receives data to and from the transfer management device 5. Specifically, the transfer management device communicator 21 receives various information including the serving devices 2 where VMs are configured and the correspondence of the collecting device 3 which becomes a transfer destination of the VM statistical information. Then, the transfer management device communicator 21 reports the received information to the serving device manager 22, and the transfer section 27. Also, the transfer management device communicator 21 transmits the load information to the transfer management device 5, the load information indicating the load (workload) of the transfer processing device 4. The load information includes, for example, the CPU usage rate of the transfer processing device 4. Further, in this embodiment, the CPU usage rate include a "large fluctuation CPU usage rate" which refers to the amount of CPU usage rate relevant to the transfer process of transferring the VM statistical information received from the serving device 2 having a fluctuation value of the transfer amount of the VM statistical information greater than a predetermined threshold value. Further, the transfer management device communicator 21 transmits the assignment shift request for requesting the transfer of the assignment of the serving device 2. In this case, the transfer management device communicator 21 measures the time period necessary to complete the relevant assignment shift process, and reports the measured time period to the shift time period manager 25.

The serving device manager 22 manages various information related to the serving devices 2 assigned to the transfer processing device 4. Specifically, the serving device manager 22 updates the serving device management table 11 (i.e., adds or deletes data of the serving device 2) based on, for example, the VM statistical information received by the collector 26 via the transfer section 27 and the report of the change (update) of the assignment of the serving devices 2 received from the transfer management device 5 by the transfer management device communicator 21. Further, the serving device manager 22 changes (updates) the shift status based on the reception state of the VM statistical information from the serving devices 2. Herein, the "reception state of the VM statistical information" refers to all of the reception states (states of the reception) which may influence the selection (decision) of the serving device 2 to be a shift target of the assignment, the reception states including, for example, a state where a collecting process of collecting the VM statistical information is under way and a state where the difference is large between the transfer amount of the VM statistical information in the previous transfer process and the transfer amount of the VM statistical information in the next to last transfer process. Further, the serving device manager 22 refers to the serving device management table 11 when the shift target determiner 23 selects the serving device 2 so that the assignment of the serving device 2 is shifted from this transfer processing device 4 to another, acquires the information of the serving device 2, and reports the acquired information to the shift target determiner 23. Further, the serving device manager 22 updates the transfer destination table 12 based on the change information of the collecting device 3 which becomes the transfer destination of the VM statistical information.

The shift target determiner 23 selects (determines) one or more serving devices 2 based on the information of the serving devices 2 reported from the serving device manager 22, so that the assignment of the serving device 2 is shifted from this transfer processing device 4 to another. In this case, shift target determiner 23 refers to the transfer time table 15, and calculates the reception estimated time when the VM statistical information is received from each serving device 2. Further, the shift target determiner 23 refers to the average shift time data table 16, and calculates the shift completion estimated time when the transfer process of the assignment of each serving device 2 completes. Details of the estimating processes are described below. Then, the shift target determiner 23 selects (determines) one or more serving devices 2 having the estimated time (timing) of receiving the VM statistical information (i.e., the reception estimated time) later than the estimated time (timing) when the shift process of the assignment completes (i.e., the shift completion estimated time). Then, the shift target determiner 23 transmits an assignment change request requesting to change the assignment of the serving device 2 along with the information (e.g., the IP address) specifying the selected serving device 2 to the transfer management device communicator 21.

The transfer timing manager 24 registers (stores) the time (timing) when the VM statistical information is last received into the transfer time table 15 for each serving device 2, the VM statistical information being transmitted from the serving devices 2 via the distributing device 6. In this case, the transfer timing manager 24 calculates the average reception time interval based on the reception time of the VM statistical information, and registers the calculated average reception time interval into the same transfer time table 15.

The shift time period manager 25 measures (calculates) the time period (time span), for example, from when the assignment shift request for requesting the shift of the assignment of the serving device 2 is transmitted to the transfer management device 5 to when a response indicating the completion of the transfer process of the assignment (i.e., the response indicating the completion of the switching process of the distribution destination of the VM statistical information in the distributing device 6) is received. Then, the shift time period manager 25 registers the measured time period into the average shift time data table 16.

The collector 26 receives the VM statistical information from the serving devices 2, and transmits the received VM statistical information to the transfer section 27.

The transfer section 27 analyzes the header and the body of the VM statistical information, and separates the VM statistical information for each VM. Further, the transfer section 27 refers to the transfer destination table 12, and specifies the collecting device 3 which becomes the transfer destination of the VM statistical information based on the VM identifier included in the VM statistical information. Further, the transfer section 27 associates the information specifying the collecting device 3 of the transfer destination with the VM statistical information separated for each VM, and transmits the associated information to the transmitter 28. Further, the transfer section 27 transmits the information indicating, for example, the transfer amount of the VM statistical information to the serving device manager 22.

The transmitter 28 transmits the VM statistical information to the collecting device 3 of the transfer destination, the VM statistical information being transmitted from the transfer section 27. The transfer section 27 (or transmitter 28) updates a transfer destination table 33 (described below) based on the change information of the collecting device 3 which becomes the transfer destination of the VM statistical information, the change information being transmitted from the transfer management device communicator 21.

Figure 11:
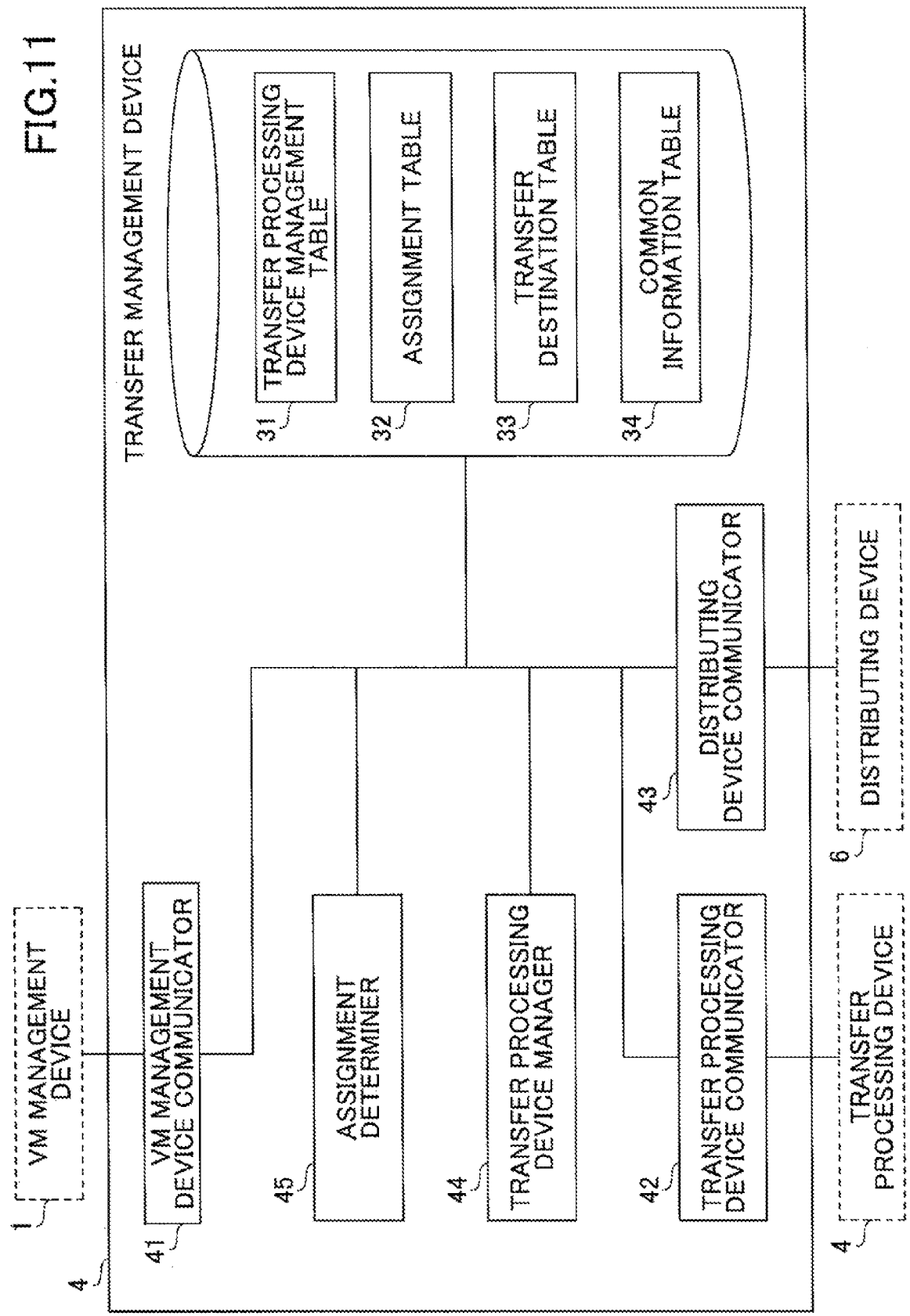
FIG. 11 is an example functional block diagram of a transfer management device.

FIG. 11 is an example block diagram of the transfer management device 5. As illustrated in FIG. 11, the transfer management device 5 includes a transfer processing device management table 31, an assignment table 32, a transfer destination table 33, and a common information table 34 in a storage (unit) of the transfer management device 5. Further, the transfer management device 5 includes a VM management device communicator 41, a transfer processing device communicator 42, a distributing device communicator 43, a transfer processing device manager 44, and an assignment determiner 45 as a control unit which is realized when a corresponding program is loaded into memory and executed by the CPU.

The transfer processing device management table 31 stores (includes) load information indicating the loads (workloads) of the transfer processing devices 4. As illustrated in FIG. 12, the transfer processing device management table 31 includes the items of the IP address of the transfer processing device 4, the CPU usage rate and the large fluctuation CPU usage rate in the transfer processing device 4.

The assignment table 32 illustrates corresponding relationship between the transfer processing device 4 and the serving devices 2 assigned to the processing devices 4. As illustrated in FIG. 13, the assignment table 32 includes the items of the IP address of the transfer processing device 4 and the IP address of the serving device 2.

The transfer destination table 33 illustrates the corresponding relationship among all of the serving devices 2 in the system, the VMs configured in the serving devices 2, and the collecting device 3 which becomes the transfer destination of the VM statistical information. As illustrated in FIG. 14, the transfer destination table 33 includes items of the IP address of the serving device 2, the VM identifier, and the IP address of the collecting device 3.

The common information table 34 stores threshold values used in various determinations performed by the transfer management device 5. As illustrated in FIG. 15, the common information table 34 includes items of a CPU usage rate unconditional assign threshold value, a CPU usage rate conditional assign threshold value, and a large fluctuation CPU usage rate threshold value. How those threshold values are used is described in the respective descriptions below.

For example, the VM management device communicator 41 transmits and receives data to and from the VM management device 1. Specifically, for example, the VM management device communicator 41 receives the system configuration information from the VM management device 1, and transmits the received system configuration information to the transfer processing device manager 44.

For example, the transfer processing device communicator 42 transmits and receives data to and from the transfer processing device 4. Specifically, for example, the transfer processing device communicator 42 receives the load information of the transfer processing device 4 and the assignment shift request of the serving device 2 from the transfer processing device 4, and reports the received information (data) to the transfer processing device manager 44 and the assignment determiner 45. Further, the transfer processing device communicator 42 transmits a report and information to the transfer processing device 4, the report indicating the change of the assignment of the serving device 2, the information specifying the collecting device 3 which becomes the transfer destination of the VM statistical information.

For example, the distributing device communicator 43 transmits and receives data to and from the distributing device 6. Specifically, the distributing device communicator 43 transmits a report indicating the change of the assignment of the serving device 2 to the distributing device 6.

The transfer processing device manager 44 manages various information related to the transfer processing device 4. Specifically, the transfer processing device manager 44 refers to and acquires information from the transfer processing device management table 31. Further, the transfer processing device manager 44 updates the transfer processing device management table 31 based on the information transmitted from the VM management device communicator 41 and the transfer processing device communicator 42. Further, the transfer processing device manager 44 updates the transfer destination table 33 based on the information of the corresponding relationship between the VMs and the collecting device 3 of the transfer destination of the VM statistical information.

The assignment determiner 45 selects (determines) the transfer processing device 4 which becomes the (another) shift destination of the assignment in response to the assignment shift request of the serving device 2 received from the transfer processing device 4. Further, the assignment determiner 45 changes the transfer processing device 4 as the assignment destination of the serving device 2 set in the assignment table 32.

The distributing device 6 includes a distribution destination table (not shown) in which the session IDs used in transmitting and receiving VM statistical information are associated with the IP addresses of the transfer processing device 4 distributing the VM statistical information transmitted using the session IDs. Further, the distributing device 6 stores information into the distribution destination table, the information indicating which session is distributed to which transfer processing device 4 when the HTTP connection of the VM statistical information is randomly distributed for the first time. After the second time, the distributing device 6 distributes the VM statistical information based on the settings in the distribution destination table. Further, upon receiving the report indicating the shift of the assignment of the serving device 2 from the transfer management device 5, the distributing device 6 replaces the IP address of the transfer processing device 4 of the distribution destination of the serving device 2 in the distribution destination table by the IP address of the transfer processing device 4 of the transfer destination included in the assignment transfer instruction (assignment shift request).

[Outline of Processes Among Devices]

Figure 16:
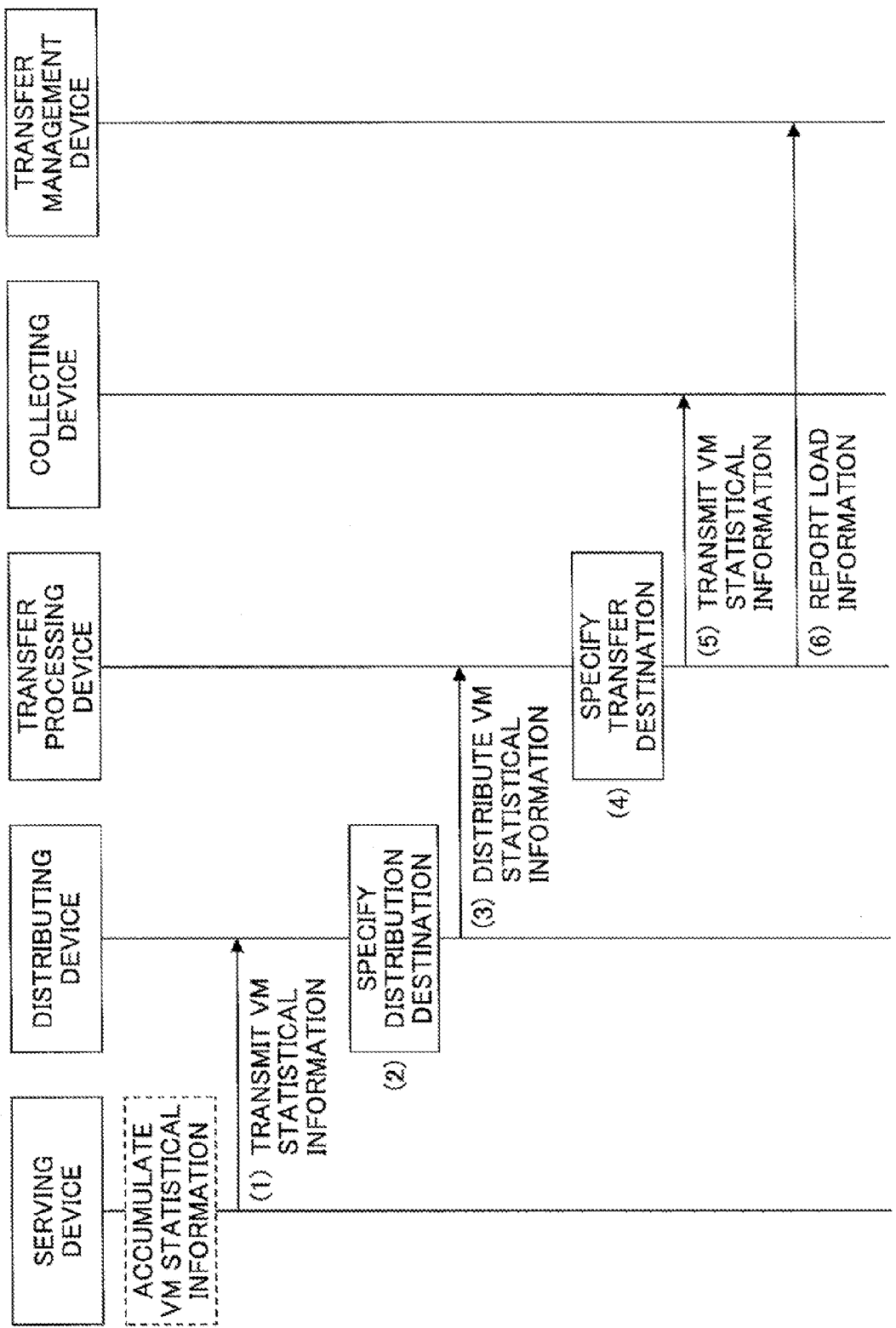
FIG. 16 illustrates an example processing sequence (a periodical VM statistical information collection process) performed between devices.

Next, the outline of the processes of the devices are described with reference to process sequence among the devices. FIG. 16 schematically illustrates a periodical collecting process of collecting the VM statistical information.

The serving device 2 accumulates the VM statistical information of the VM configured in the serving device 2. Further, the serving device 2 transmits the accumulated VM statistical information to the distributing device 6 (1) (i.e., the process (1) in FIG. 16). In this case, the serving device 2 may transmit the VM statistical information at any appropriate time (appropriate trigger condition) (e.g., every predetermined time period set by a timer, or at the timing when a predetermined amount of the VM statistical information is accumulated). In this embodiment, however, it is assumed that the VM statistical information is (repeatedly) transmitted at least every predetermined time period or at a substantial interval. Upon receiving the VM statistical information from the serving device 2, the distributing device 6 refers to the distribution destination table, and specifies the transfer processing device 4 as the distribution destination of the VM statistical information, the transfer processing device 4 being associated with the session ID of the VM statistical information (2). Then the distributing device 6 distributes the VM statistical information to the transfer processing device 4 specified as the distribution destination (3). Upon receiving the VM statistical information, the transfer processing device 4 specifies the collecting device 3 which becomes the transfer destination of the received VM statistical information (4). Then, the transfer processing device 4 transmits the VM statistical information to the specified collecting device 3 (5). Further, the transfer processing device 4 transmits the load information of the transfer processing device 4 to the transfer management device 5 (6). The devices repeat the processes (1) through (6). However, for example, the transfer processing device 4 may independently perform the transmission process of the load information of the transfer processing device 4 (6). Namely, for example, the transfer processing device 4 may perform the transmission process every predetermined time period as the independent process regardless of the processes (1) through (5) in the collecting process of collecting the VM statistical information.

Figure 17:
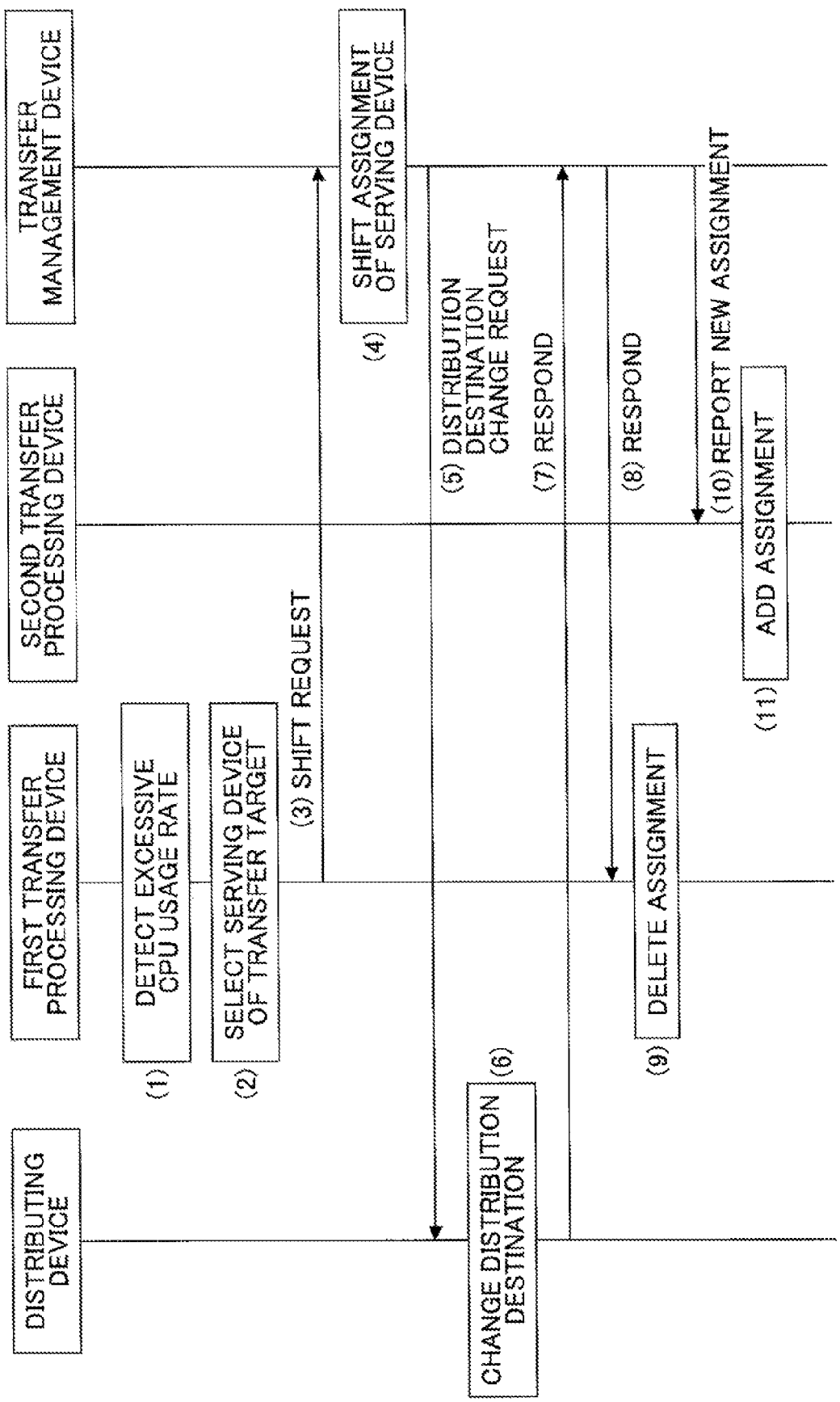
FIG. 17 illustrates an example processing sequence (a serving device assignment shift process due to excessive CPU usage rate of the transfer processing device) performed between devices.

Next, a process of shifting the assignment of the serving device 2 to the transfer processing device 4 for assignment of the serving device 2 to another transfer processing device 4 is described. Specifically, the shift process of shifting the assignment of the serving device 2 is described with reference to FIG. 17 when, for example, the CPU usage rate of the transfer processing device 4 exceeds the CPU usage rate threshold value. In this case, the transfer processing device 4 may detect the state at any time, the state indicating that the CPU usage rate of the transfer processing device 4 exceeds the CPU usage rate threshold. Hereinafter, in this embodiment, the transfer processing device 4 having the CPU usage rate greater than the CPU usage rate threshold value is referred to as a "first transfer processing device 4"; and the transfer processing device 4 which becomes the transfer destination of the assignment of the serving device 2 which is (currently) assigned to the first transfer processing device 4 refers to a "second transfer processing device 4".

The first transfer processing device 4 detects the state that the CPU usage rate of the first transfer processing device 4 exceeds the CPU usage rate threshold value (1). The first transfer processing device 4 selects one or more serving devices 2 having the assignment to be transferred so that the selected serving devices 2 are assigned to another transfer processing device from among the transfer processing devices 4 which are assigned to this first transfer processing device 4 for the transfer process (2). Then, the first transfer processing device 4 transmits a request to the transfer management device 5, the request requesting for shifting the assignment of the selected serving devices 2 to another transfer processing device 4 (3). On the other hand, upon receiving the request from the first transfer processing device 4, the transfer management device 5 selects the second transfer processing device 4 which becomes the shift destination of the assignment of the serving devices 2. Further, in response to the shift of the assignment to the second transfer processing device 4, the transfer management device 5 updates the relevant table and the like (4). Further, the transfer management device 5 transmits a request to the distributing device 6, the request requesting to change the distribution destination of the VM statistical information from the serving device 2 having the assignment to be shifted to the second transfer processing device 4 (5). Upon receiving the request, the distributing device 6 changes the distribution destination of the VM statistical information from the serving device 2 having the assignment to be shifted to the reported second transfer processing device 4 (6). Further, the distributing device 6 responds to the transfer management device 5 by reporting that the change process of the distribution is completed (7). Upon receiving the report (response), the transfer management device 5 transmits a report to the first transfer processing device 4, the report indicating that the process of transferring the assignment of the serving device 2 to be shifted to the second transfer processing device 4 is completed (8). Upon receiving the report, the first transfer processing device 4 deletes the information of the serving device 2 to be transferred from among the serving devices 2 assigned to the first transfer processing device 4 (9). Further, the transfer management device 5 transmits a report to the second transfer processing device 4, the report indicating that the serving device 2 to be shifted is now assigned to the second transfer processing device 4 (10). The second transfer processing device 4 adds the serving device 2 to be shifted to the information indicating the serving devices 2 is assigned to the second transfer processing device 4 (11). The processes (10) and (11) may not be performed. In this case, for example, the second transfer processing device 4 may detect that a new serving device 2 is assigned to the second transfer processing device 4 by specifying (notifying) the serving device 2 of the transmission source of transmitting the VM statistical information when the second transfer processing device 4 receives the VM statistical information from the distributing device 6 in the next transmission of the VM statistical information (This note may also be applied to the processes similar to the processes (10) and (11) above). Further, either the processes (8) and (9) or the processes (10) and (11) may be performed earlier. When all of the above processes are performed, the assignment shift process of the transfer processing device 4 may be completed as a whole system.

Further, when the assignment of the serving device 2 to the transfer processing device 4 is shifted to another transfer processing device 4, the number of the serving devices 2 to be shifted is not limited to one but may be two or more. Further, the time (trigger condition) when the process of shifting the assignment of the serving device 2 to the transfer processing device 4 to another transfer processing device 4 is not limited to the case where the CPU usage rate of the transfer processing device 4 exceeds the CPU usage rate threshold value. For example, the assignment shift request may be transmitted when, for example, a total transfer amount of all the serving devices 2 having the shift status of "shifting" exceeds a predetermined threshold value. In this case, as the transfer amount, for example, the transfer amount in the previous time or an average value of the transfer amount in the previous time or in the next to last may be used. Further, for example, the data that may be used for specifying (estimating) the amount of load of the transfer processing device 4 when the VM statistical information is transmitted from the serving devices 2 may be maintained in the serving device management table 11. Further, when the total load value of all the serving devices 2 having the shift status of "shifting" exceeds a predetermined threshold value, the assignment shift process of the serving device 2 may be performed.

Further, when the system configuration change including the change of the configuration status of the VMs in the serving devices 2 and the configuration of the collecting device 3 occurs, the VM management device 1 transmits the system configuration information to the transfer management device 5. In this case, based on the system configuration information, the transfer management device 5 updates the tables in the transfer management device 5. Further, when necessary, the transfer management device 5 transmits the system configuration information to the transfer processing device 4. Based on the received system configuration information, the transfer processing device 4 updates the tables in the transfer processing device 4. The system configuration information may be reported when, for example, the VM is newly configured or deleted in any of the serving devices 2 due to the addition or deletion of the serving device 2, or when one serving device 2 is shifted to another serving device 2, or when the collecting device 3 is newly added or deleted.

[Process in Transfer Processing Device]

Figure 18:
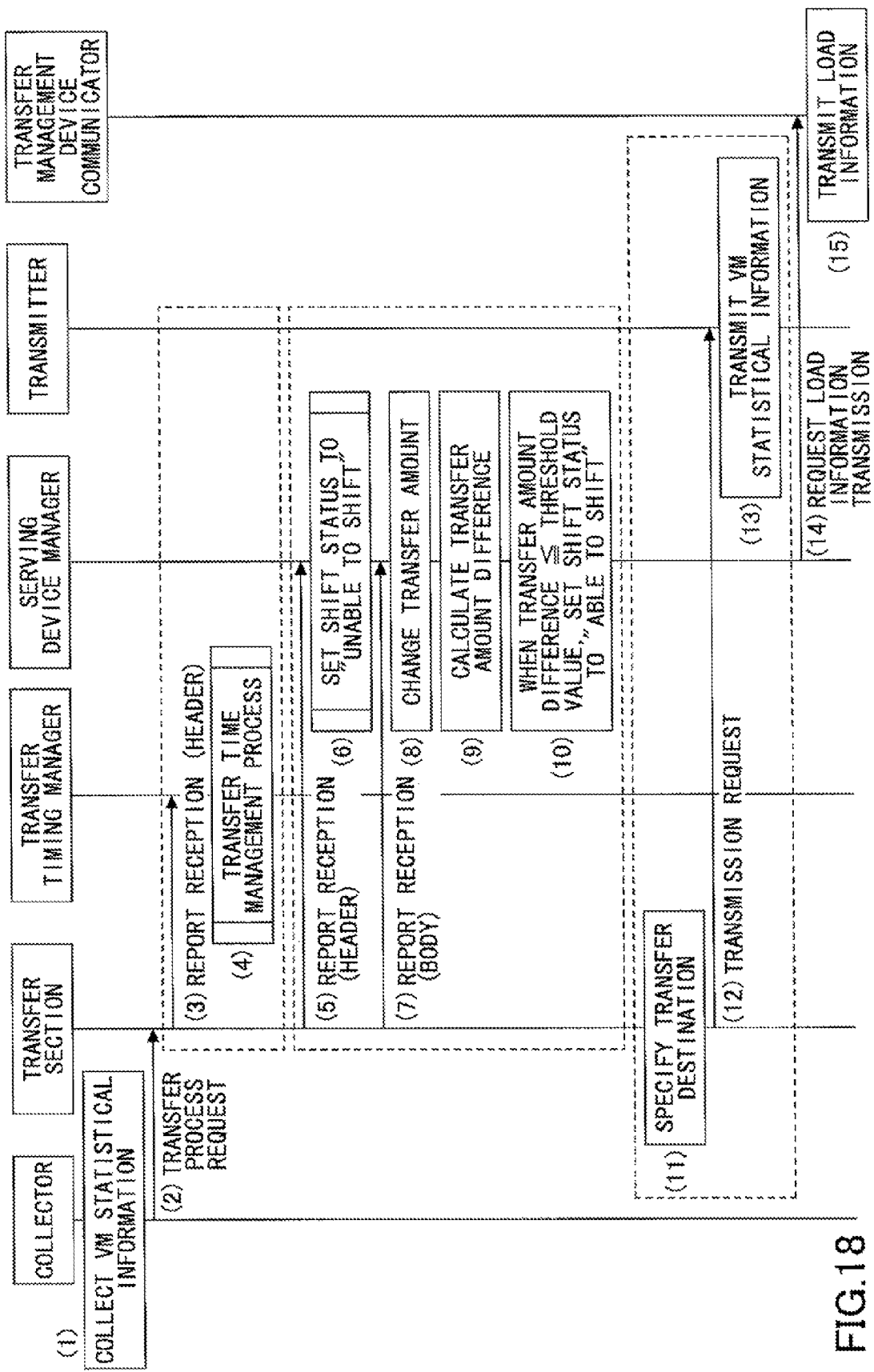
FIG. 18 illustrates an example processing sequence (a periodical VM statistical information collection process) performed between devices.

Next, a process sequence performed among the configuration elements in the transfer processing device 4 is described. FIG. 18 illustrates example processes performed in the transfer processing device 4. in the periodical collecting process of collecting the VM statistical information.

The collector 26 receives the VM statistical information from the serving device 2 (1). The VM statistical information includes the header containing the IP address of the serving device 2 as the transmission source and the session ID, and the body including data indicating the specific contents of the VM statistical information. The VM statistical information transmitted at one time includes the information of one or more VMs. The data indicating the specific contents of the VM statistical information are associated with the VM identifier for each of the VMs. The data configuration described above is an example only.

Further, the collector 26 transmits the received VM statistical information to the transfer section 27, and requests the transfer section 27 for the transfer process of the VM statistical information (2).

The transfer section 27 receiving the VM statistical information and the request for the transfer process performs the following processes. First, the transfer section 27 analyzes the header of the VM statistical information, acquires the IP address of the serving device 2 which is the transmission source of the VM statistical information and the session ID, and stores the acquired IP address and the session ID into the session management table 14. Though it is not illustrated in the figure, the collector 26 reports the completion of storing the data into the session management table 14 to the serving device 2.

Further, the transfer section 27 transmits the reception report including at least the IP address of the serving device 2 which is the transmission source of the VM statistical information to the transfer timing manager 24 (3). Upon receiving the reception report, the transfer timing manager 24 performs a transfer timing management process. Details of the transfer timing management process are described below with reference to FIG. 19 below (4).

Further, the transfer section 27 transmits a reception report including at least the IP address of the serving device 2 which is the transmission source of the VM statistical information and the session ID to the serving device manager 22 (5).

In this case, the serving device manager 22 changes the shift status of the records corresponding to the serving device 2 to "unable to shift" in the serving device management table 11 (6). In this process (6), the shift status of the serving device 2 that starts collecting the VM statistical information is changed (stored in the storage (unit)). Namely, this process (6) is to change the shift status of the serving device 2 based on the reception state of the VM statistical information from the serving device 2. This process may have the following meaning (purpose). Namely, in a case where the assignment of the serving device 2 is transferred to another transfer processing device 4, if one serving device 2 relevant to the transfer processing device 4 that is currently receiving the VM statistical information during the collection process of the VM statistical information is selected as the transfer target and the transfer process is performed, and the serving device 2 transmits the change request for changing the distribution destination of the received VM statistical information to the distributing device 6, there may be the following possibilities. Namely, in this case if the system is designed to respond to the request, stop (interrupt) the transmission process of the VM statistical information which is under transmission from the distributing device 6 to the serving device 2, and transmit the VM statistical information to the serving device 2 designated by this change, the collecting process of collecting the VM statistical information may be interrupted. In that case, the transfer processing device 4 of the shift destination may have to collect the VM statistical information from the very start, which may generate a wasteful transfer process. On the other hand, by setting the shift status of the serving device 2 which is set as the target of the collecting process to "unable to shift", it may become possible to specify (detect) that it is not possible to select the serving device 2 as the shift target. Therefore, the serving device 2 may not be selected when the assignment of one serving device 2 is shifted to another transfer processing device 4 (see (2)-(4) of FIG. 20, described below). Therefore, it may become possible to avoid the occurrence of the wasteful transfer process.

Further, the transfer section 27 analyzes the body of the VM statistical information and specifies the data amount (i.e., transfer amount) of the VM statistical information. Further, the transfer section 27 transmits the reception report including at least the IP address and the transfer amount of the serving device 2 as the transmission source of the VM statistical information to the serving device manager 22 (7). The serving device manager 22 updates the serving device management table 11 by replacing the transfer amount in the next to last by the transfer amount in the previous time and further replacing the transfer amount in the previous time by the transfer amount received from the transfer section 27 in the record corresponding to the target serving device 2 (8). Further, the serving device manager 22 calculates the difference between the transfer amount in the previous time and the transfer amount in the next to last (9).

Herein, when determining that the calculated difference by the serving device manager 22 is equal to or less than the fluctuation amount threshold value (i.e., transfer amount fluctuation threshold value) of the common information table 13, the serving device manager 22 changes (sets) the collecting destination status (shift status) of the record corresponding to the target serving device 2 to "able to shift" (10). This process (10) refers to a process to change the shift status of the serving device 2 in response to the transfer amount of the VM statistical information (store in the storage (unit)). Namely, this process (10) refers to a process to change the shift status of the serving device 2 based on the reception state of the VM statistical information from the serving device 2. This process may have the following meaning (purpose). Namely, when determining that the difference between the transfer amount in the previous time and the transfer amount in the next to last is equal to or less than the fluctuation amount threshold value (i.e., transfer amount fluctuation threshold value), it may become possible to determine that the fluctuation of the transfer amount of the VM statistical information transmitted from the serving device 2 is relatively small. Therefore, when the assignment of the serving device 2 is transferred to another transfer processing device 4, it may become possible to determine the possibility that the load of the another transfer processing device 4 due to the transfer process becoming unstable is low. Therefore, it may become possible to determine the serving device 2 as the transfer target. On the other hand, when determining that the difference between the transfer amount in the previous time and the transfer amount in the next to last is greater than the fluctuation amount threshold value (i.e., transfer amount fluctuation threshold value), the shift status is maintained as "unable to shift".

As further processes, the transfer section 27 refers to the transfer destination table 12 and specifies the IP address of the collecting device 3 of the transfer destination corresponding to the VM identifier included in the received VM statistical information (11). Then, the transfer section 27 transmits a request to the transmitter 28, the request requesting for transmitting the specified IP address of the collecting device 3 of the transfer destination and the VM statistical information to the collecting device 3 (12). Upon receiving the request from the transfer section 27, the transmitter 28 transmits the VM statistical information to the collecting device 3 by using the received IP address of the collecting device 3 of the transfer destination (13).

Further, the serving device manager 22 generates the load information of the transfer processing device 4, and transmits a transmission request of the load information to the transfer management device communicator 21 (14). Specifically, the serving device manager 22 specifies the CPU usage rate and the large fluctuation CPU usage rate of the transfer processing device 4. Then, the serving device manager 22 transmits the CPU usage rate and the large fluctuation CPU usage rate along with the load information in a manner such that the CPU usage rate and the large fluctuation CPU usage rate are included in the load information. The transfer management device communicator 21 transmits the load information to the transfer management device 5 (15).

The processes (1) to (13) are performed in the serving devices 2 assigned to the transfer processing device 4. Further, any of the processes (3) and (4) and the processes (5) and (6) may be performed earlier. Further, the processes (3) and (4) and the processes (5) and (6) may be performed in parallel. Further, it is assumed the processes (7) to (10) and the processes (11) to (13) are performed after the processes (5) and (6) are completed. Further, any of the processes (7) to (10) and the processes (11) to (13) may be performed earlier. Further, the processes (7) to (10) and the processes (11) to (13) may be performed in parallel. Further, as described above, the transmitting processes (14) and (15) may be independently performed every predetermined time period regardless of the collecting process of collecting the VM statistical information.

Figure 19:
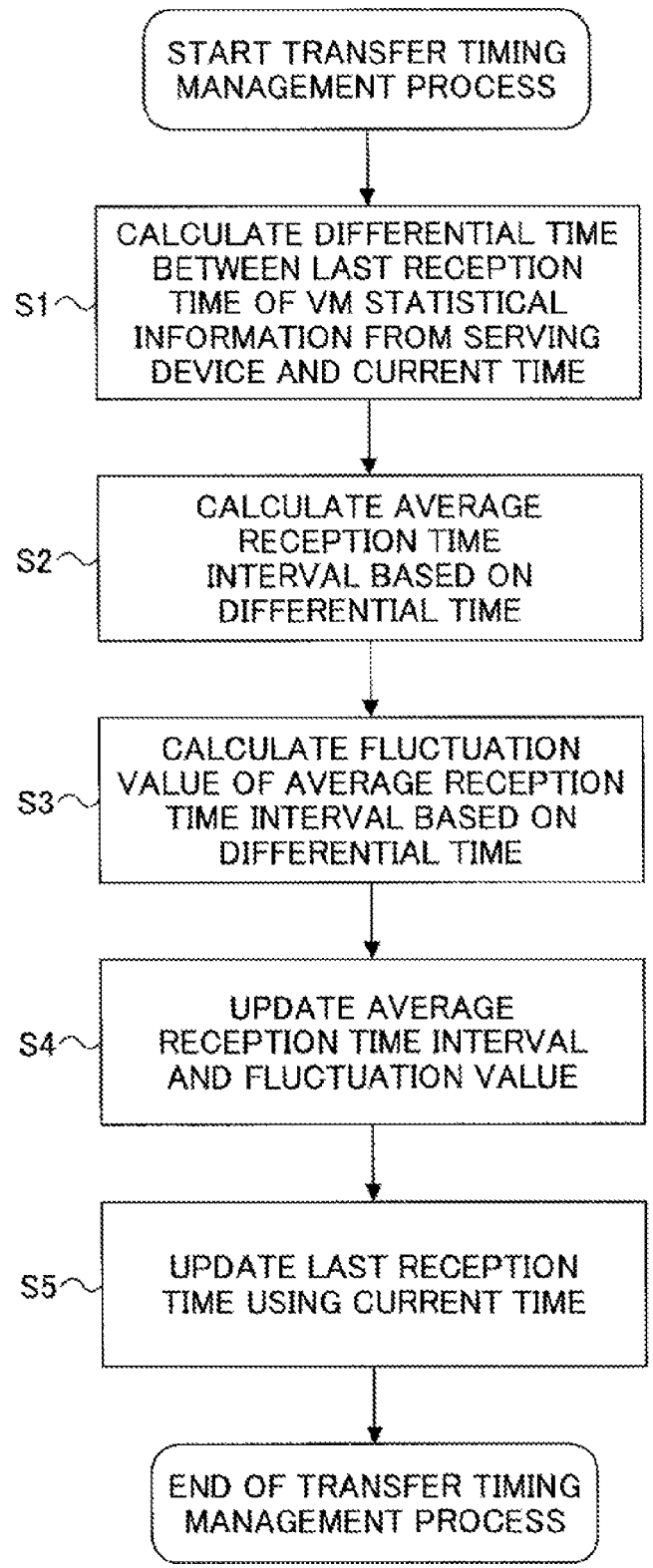
FIG. 19 is a flowchart illustrating an example transfer time management process.

Next, the transfer timing management process performed by the transfer timing manager 24 is described with reference to the flowchart of FIG. 19. In step S1, the transfer timing manager 24 acquires the time (timing data) when last (i.e., previously) received the VM statistical information from the serving devices 2 which is the transmission source of the VM statistical information. Specifically, the transfer timing manager 24 refers to the transfer time table 15, and acquires the last reception time corresponding to the IP address of the serving devices 2 which is the transmission source of the VM statistical information. Then, the transfer timing manager 24 calculates the differential time between the current time and the last reception time (more specifically, between the time (timing) when the VM statistical information is previously received and the time (timing) when the VM statistical information is received this time).

In step S2, the transfer timing manager 24 calculates the average reception time interval reflecting the latest differential time calculated in step S1. This calculation may be realized in various methods. For example, the following formula may be used.

$$T\_new = \beta T + (1-\beta) T\_old$$

(T_new: average reception time interval of calculation target, T_old: average reception time interval calculated in previous time, T: differential time calculated in step S1, β: update coefficient (0<β<1))

The average reception time interval calculated in previous time (T_old) refers to the average reception time interval which is stored in the transfer time table 15 and corresponds to the IP address of the serving devices 2 which is the transmission source of the VM statistical information. Further, the update coefficient may be previously set in the storage of the transfer processing device 4. The greater the update coefficient is, the more the differential time calculated this time reflects the calculated average reception time interval.

In step s3, the transfer timing manager 24 calculates the fluctuation value indicating the fluctuation (fluctuation width) of the average reception time interval based on the previous average reception time interval stored in the transfer time table 15 and the average reception time interval calculated in step S2. As the fluctuation value, the transfer timing manager 24 calculates, for example, a difference between the previous average reception time interval and the current average reception time interval. The method of calculating the fluctuation value is not limited to the method described above. For example, the deviation value may be calculated based on the previous average reception time interval and the current average reception time interval.

In step S4, the transfer timing manager 24 updates the average reception time interval and an average reception time interval fluctuation value by using the calculated average reception time interval and the fluctuation value.

In step S5, the transfer timing manager 24 updates the last reception time stored in the transfer time table 15 and corresponding to the IP address of the serving devices 2 which is the transmission source of the VM statistical information by using the current time.

Further, for example, when the time interval of transmitting the VM statistical information from the serving devices 2 is fixedly determined and the time interval of receiving the VM statistical information by the transfer processing device 4 is constant, for example, the following method may be used. Namely, the average reception time interval is not calculated based on the process of the average reception time interval stored in the transfer time table 15, but is set as the reception time interval using a fixed value by the system administrator or the like.

Figure 20:
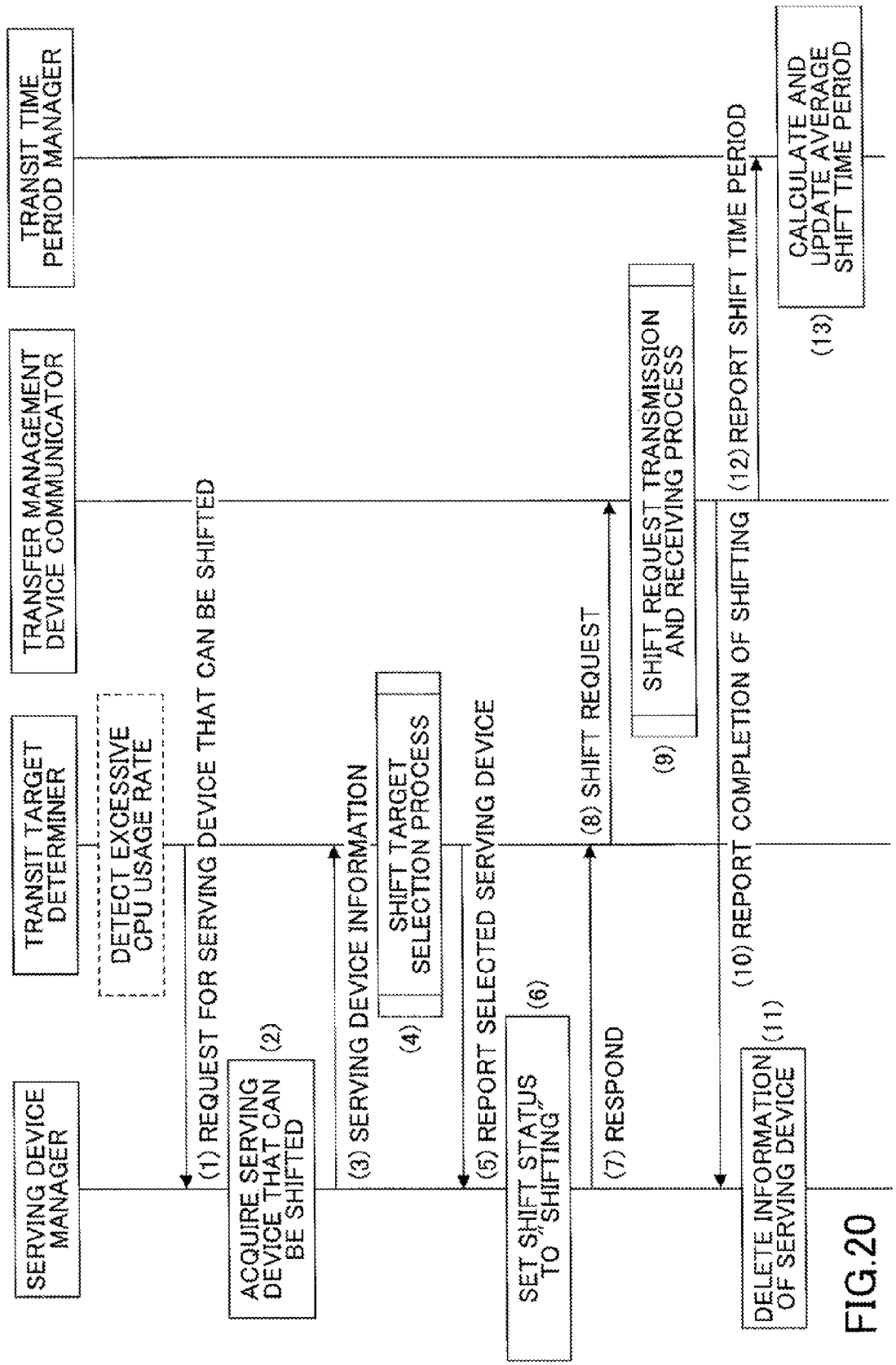
FIG. 20 illustrates an example processing sequence (a serving device assignment shift process due to the excessive CPU usage rate of the transfer processing device) performed by the transfer processing device.

FIG. 20 is an example sequence diagram illustrating an example process of transferring the assignment of the serving device 2 assigned to the transfer processing device 4 to another transfer processing device 4. In this process, since the CPU usage rate of the transfer processing device 4 exceeds the threshold value, the assignment of the serving device 2 to this transfer processing device 4 is transferred to another transfer processing device 4.

When detecting that the CPU usage rate of this transfer processing device 4 exceeds the CPU usage rate threshold value, the shift target determiner 23 transmits a request to the serving device manager 22, the request requesting for reporting the serving device 2 that may shift the assignment to another transfer processing device 4 from among the serving devices 2 assigned to this transfer processing device 4 (1). Upon receiving the request from the shift target determiner 23, the serving device manager 22 refers to the serving device management table 11, and acquires the IP address of one or more serving devices 2 having the shift status "able to shift" from among the serving devices 2 assigned to this transfer processing device 4 (2). Then, the serving device manager 22 reports the acquired IP address of one or more serving devices 2 to the shift target determiner 23 (3).

The shift target determiner 23 performs a shift target selection process of selecting the shift target from among the serving devices 2 reported from the serving device manager 22 (4). Further, details of the shift target selection process are described below with reference to FIG. 21.

Further, the shift target determiner 23 reports the selected serving device 2 to the serving device manager 22 (5). The serving device manager 22 changes the shift status of the selected serving device 2 in the serving device management table 11 to "shifting" (6). Further, the serving device manager 22 reports the change (update) of the serving device management table 11 to the shift target determiner 23 (7). Upon receiving the report, the shift target determiner 23 refers to the session management table 14, and acquires the session ID corresponding to the selected serving device 2. Then, the shift target determiner 23 transmits the assignment shift request for requesting the shifting of the assignment of the serving device 2 along with the acquired session ID to the transfer management device communicator 21 (8).

The transfer management device communicator 21 performs a shift request transmission and receiving process by transmitting the assignment shift request of the serving device 2 to the transfer management device 5 and receiving a response indicating that the assignment shift process is performed from the transfer management device 5 (9). The shift request transmission and receiving process includes a process of measuring the time when the transfer process is performed and also a time period from when the assignment shift request is transmitted to when the response is received (i.e., the shift time period necessary for the transfer process). Details of the shift request transmission and receiving process are described below with reference to FIG. 22. Upon receiving the response from the transfer management device 5, the transfer management device communicator 21 reports that the assignment shift process is completed to the serving device manager 22 (10). Upon receiving the report from the transfer management device communicator 21, the serving device manager 22 deletes a record of the serving device 2 which becomes the transfer target in the serving device management table 11 and the session management table 14 (11).

On the other hand, upon receiving the response from the transfer management device 5, the transfer management device communicator 21 transmits the shift time period measured in the shift request transmission and receiving process to the shift time period manager 25 (12). Upon receiving the shift time period, the shift time period manager 25 calculates an average shift time period (13). There may be some methods to calculate the average shift time period. For example a method of using the following formula may be used.

$$T\_new = \beta T + (1-\beta) T\_old$$

(T_new: average shift time period of calculation target, T_old: average shift time period calculated in previous time, T: shift time period reported from the transfer management device communicator 21, β: update coefficient (0<β<1))

As the average shift time period calculated in previous time, the shift time period manager 25 refers to the average shift time data table 16. Further, the update coefficient may be set in the storage of the transfer processing device 4. The greater the update coefficient is, the more shift time period measured reflects the calculation result of the average shift time period.

Figure 21:
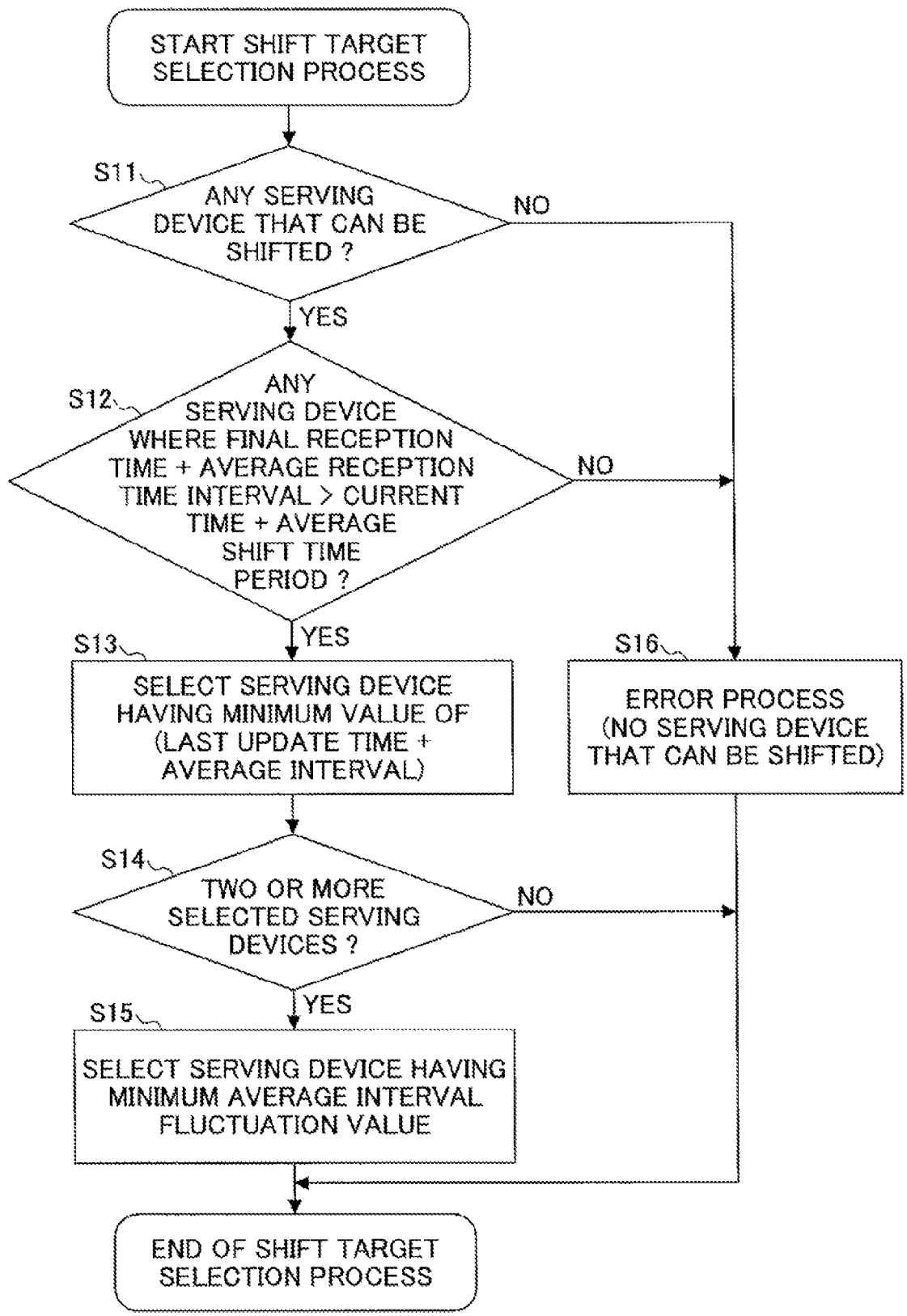
FIG. 21 is a flowchart illustrating an example shift target selection process.

Next, the shift target selection process performed by the shift target determiner 23 is described with reference to the flowchart of FIG. 21.

In step S11, the shift target determiner 23 determines whether there is the serving device 2 having the shift status "able to shift" (i.e., whether one or more serving devices 2 are reported from the serving device manager 22). When determining that there is the serving device 2 having the shift status "able to shift" (YES in step S11), the process goes to step S12, and otherwise (NO in step S11), the process goes to step S16.

In step S12, the shift target determiner 23 calculates the reception estimated time when the VM statistical information is to be received in the feature, more specifically when VM statistical information is received next time, for one or more serving devices 2 reported from the serving device manager 22. Further, the shift target determiner 23 further calculates the shift completion estimated time when the assignment shift process is completed. Further, the shift target determiner 23 selects the serving device 2 having the reception estimated time to receive the next VM statistical information later than the shift completion estimated time of the assignment. Specifically, the shift target determiner 23 refers to the transfer time table 15 and the average shift time data table 16 for each of the serving devices 2, calculates time by adding the average reception time interval to the final reception time set in the transfer time table 15, and sets the calculated time as the reception estimated time when the VM statistical information is next received. On the other hand, the shift target determiner 23 calculates time by adding the average shift time period in the average shift time data table 16 to the current time and sets the calculated time as the shift completion estimated time of the assignment. Then, the shift target determiner 23 determines whether there is the serving device 2 having the reception estimated time to receive the next VM statistical information later than the shift completion estimated time of the assignment. The serving device 2 satisfying this condition refers to the following equation: [final reception time+average reception time interval]>[current time+average shift time period]. For example, a case is described where the transfer time table 15 has data of FIG. 9, the average shift time period is 2 sec as FIG. 10, and the current time is [5:09'54]. In this case, the shift completion estimated time is [5:11'54]. On the other hand, the data of the reception estimated time of the serving device 2 having the IP addresses [10.0.0.1], [10.0.0.2], [10.0.0.3], and [10.0.0.4] are [5:11'40], [5:11'58], [5:11'50], and [5:12'15], respectively. Therefore, in this case, the serving devices 2 that satisfy the above condition are the serving devices 2 having the IP addresses [10.0.0.2] and [10.0.0.4].

When determining that there is such a serving device 2 (YES in step S12), the process goes to step S13. Otherwise (NO in step S12), the process goes to step S16.

In step S13, the shift target determiner 23 selects the serving device 2 having the earliest reception estimated time (i.e., min[final reception time+average reception time interval]) from among the serving devices 2 having the reception estimated time to receive the next VM statistical information later than the shift completion estimated time. In other words, the shift target determiner 23 selects the serving device 2 having the reception estimated time to receive the next VM statistical information later than the shift completion estimated time and having the reception estimated time closest to the shift completion estimated time. Further, in this example, the serving device 2 having the IP addresses [10.0.0.2] is selected. As described above, by selecting the serving device 2 having the earliest time data calculated by adding the average reception time interval to the final reception time, it may become possible to promptly reduce the load of the transfer processing device 4.

In step S14, the shift target determiner 23 determines whether the number of the serving devices 2 having the earliest reception estimated time to receive the next VM statistical information (i.e., whether there are two or more serving devices 2 having the same reception estimated time). When determining that there are two or more serving devices 2 having the same reception estimated time (YES in step S14), the process goes to step S15. When determining that there is only one serving device 2 having the earliest reception estimated time (NO in step S14), the process ends.

In step S15, the shift target determiner 23 refers the transfer time table 15, and selects the serving device 2 having the least average reception time interval fluctuation value from among the serving devices 2 selected in step S13. By doing this, it may become possible to reduce an error between the time estimated as the time when the next VM statistical information is received and the time when the VM statistical information is actually received.

In step S16, the shift target determiner 23 performs an error process indicating (displaying) that there is no serving device 2 having the assignment that may not be shifted. In this error process, for example, the shift target determiner 23 may issue an alarm to the transfer management device 5 via the transfer management device communicator 21. Alternatively, any other appropriate method may be used.

Alternatively, for example, the shift target determiner 23 may select the serving device 2 having the greatest transfer amount from among the serving devices 2 having the reception estimated time to receive the next VM statistical information later than the shift completion estimated time. By doing this, it may become possible to effectively reduce the processing load of the transfer processing device 4 due to the shifting of the assignment of the serving device 2. Further, in another example, the shift target determiner 23 may select the serving device 2 having the least fluctuation value between the transfer amount in the previous time and the transfer amount in the next to last from among the serving devices 2 satisfying the above condition. By doing this, it may become possible to stabilize the operation of the transfer processing device 4 which is transfer destination of the assignment.

Further, in the shift target selection process, two or more serving devices 2 may be selected. In this case, it may be preferable to select the serving device 2 having the reception estimated time to receive the next VM statistical information closer (i.e., earlier) to the shift completion estimated time than any other serving devices 2 from among the serving devices 2 having the reception estimated time to receive the next VM statistical information later than the shift completion estimated time.

Further, the shift target determiner 23 may select two or more serving devices 2 so that the total transfer amount exceeds a predetermined value from among the serving devices 2 satisfying the above condition. By doing this, it may become possible to greatly reduce the load of the transfer processing device 4 even when the load of the transfer processing device 4 is increased sharply.

Figure 22:
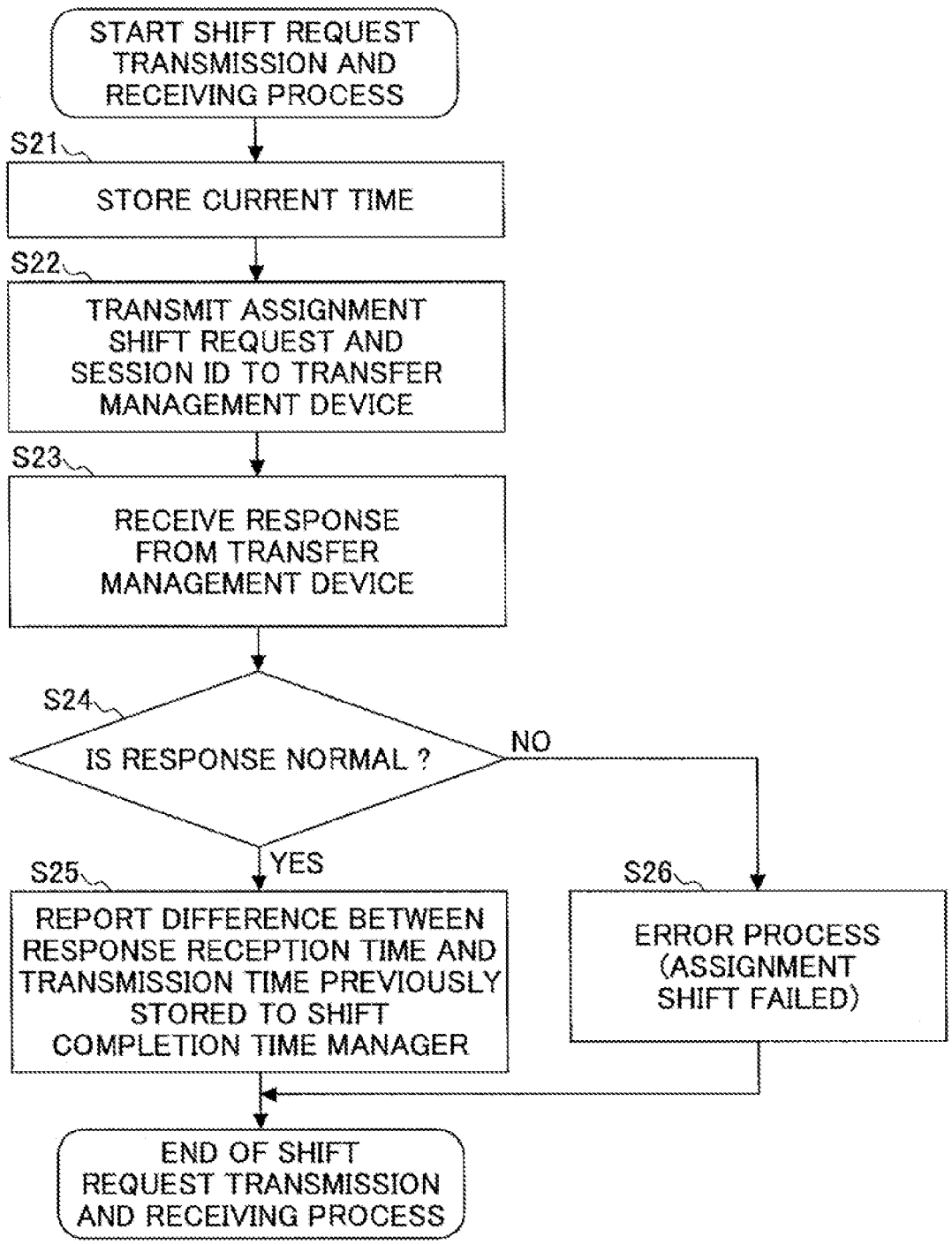
FIG. 22 is a flowchart illustrating an example shift request transmission and receiving process.

Next, the shift request transmission and receiving process performed by the transfer management device communicator 21 is described with reference to the flowchart of FIG. 22.

In step S21, the transfer management device communicator 21 stores the current time into the storage as the transmission time of the assignment shift request (in advance).

In step S22, the transfer management device communicator 21 transmits the assignment shift request to the transfer management device 5. The IP address of one or more serving devices 2 selected as the transfer target and the session ID are attached to the assignment shift request.

In step S23, the transfer management device communicator 21 receives the response from the transfer management device 5 as the response to the assignment shift request in step S22.

In step S24, the transfer management device communicator 21 determines whether the response in step S24 is normal (i.e., whether the assignment shift process is normally completed). When determining that the response is normal (YES in step S24), the process goes to step S25. Otherwise (NO in step S24), the process goes to step S26.

In step S25, the transfer management device communicator 21 determines (calculates) the shift time period by calculating the differential time between the transmission time of the assignment shift request stored in step S21 and the current time when the response is received.

In step S26, the transfer management device communicator 21 performs an error process indicating (displaying) that the shift request transmission and receiving process is failed. In this error process, for example, the transfer management device communicator 21 may issue an alarm to the transfer management device 5 via the transfer management device communicator 21. Alternatively, any other appropriate method may be used.

On the other hand, in the transfer processing device 4 to which the serving device 2 is newly assigned due to the assignment shift process of the serving device 2, the following processes are performed. Namely, when the transfer management device communicator 21 receives the report indicating that the serving device 2 is newly assigned along with the IP address and the session ID of the serving device 2, the serving device manager 22 adds the record corresponding to the serving device 2 to the serving device management table 11 and the session management table 14. Then, the transfer management device communicator 21 reports that a serving device addition process is performed in the transfer processing device 4 to the transfer management device 5.

Herein, for example, not only when the assignment shift request of the serving device 2 is received but also when the various system configuration information are received from the transfer management device 5, the transfer processing device 4 performs a process to reflect and store the those information to the information stored in the transfer processing device 4. For example, when the collecting device 3 which becomes the transfer destination of the VM statistical information driven in the serving device 2 assigned to the transfer processing device 4 is changed, the transfer processing device 4 performs the following processes. Namely, upon receiving a change report including the VM identifier and the updated IP address of the collecting device 3 from the transfer management device 5, the transfer processing device 4 changes the IP address of the collecting device 3 corresponding to the VM identifier in the received change report in the transfer destination table 12 using the updated IP address of the collecting device 3.

[Processes of Transfer Management Device]

Figure 23:
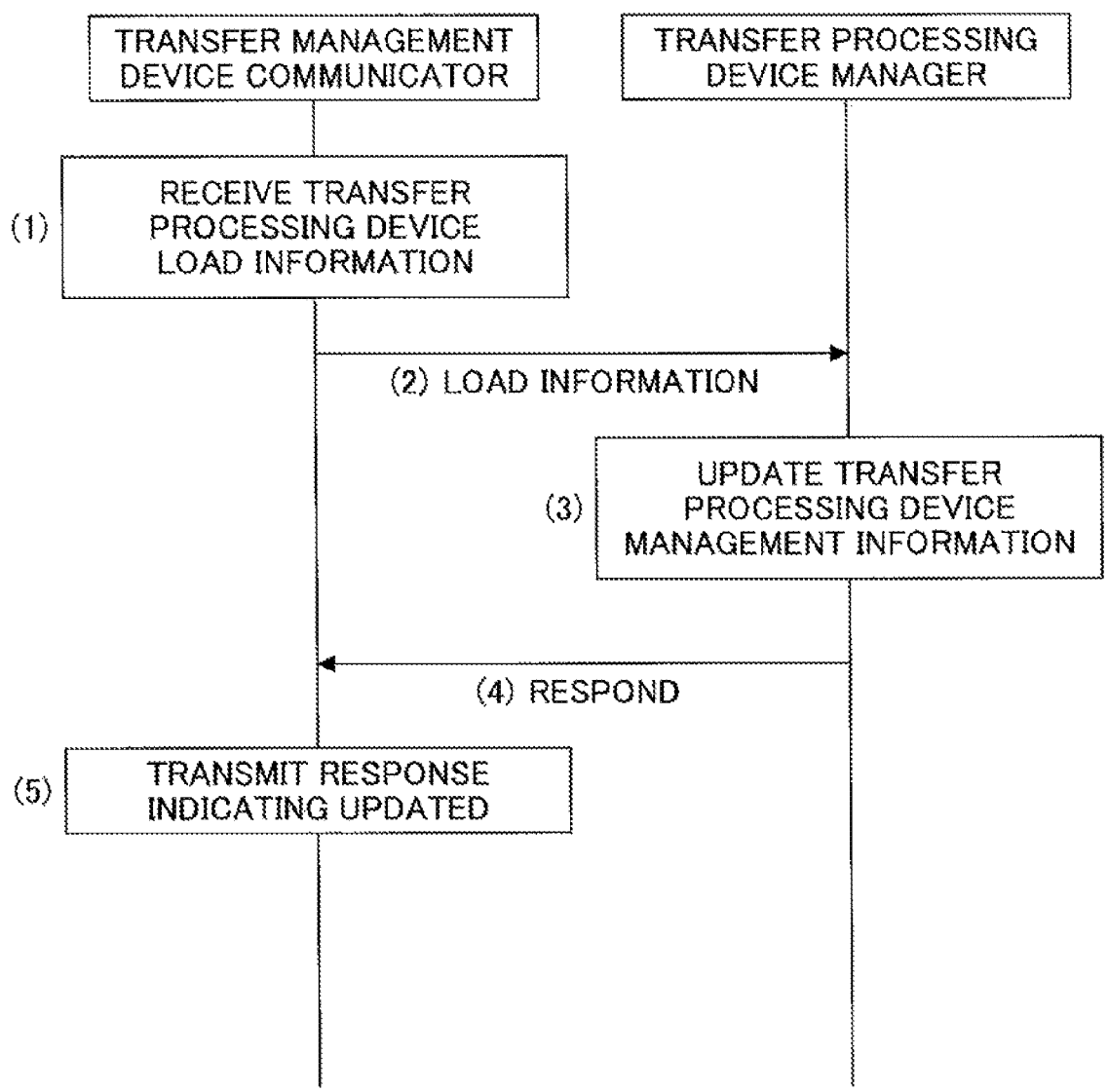
FIG. 23 illustrates an example processing sequence (upon receipt of load information of the transfer processing device) of the transfer management device.

Next, a process sequence performed among the configuration elements of the transfer management device 5 is described. FIG. 23 illustrates processes when the load information is periodically received from the transfer processing device 4.

The transfer processing device communicator 42 receives the load information from the transfer processing device 4

(1). The transfer processing device communicator 42 transmits the received load information to the transfer processing device manager 44 (2). The transfer processing device manager 44 updates the transfer processing device management table 31 by reflecting the received load information (3). Further, the transfer processing device manager 44 reports that the load information is updated to the transfer processing device communicator 42 (4). Then, the transfer processing device communicator 42 transmits the response indicating that the load information is updated to the transfer processing device 4 which is the transmission source of the load information (5).

Figure 24:
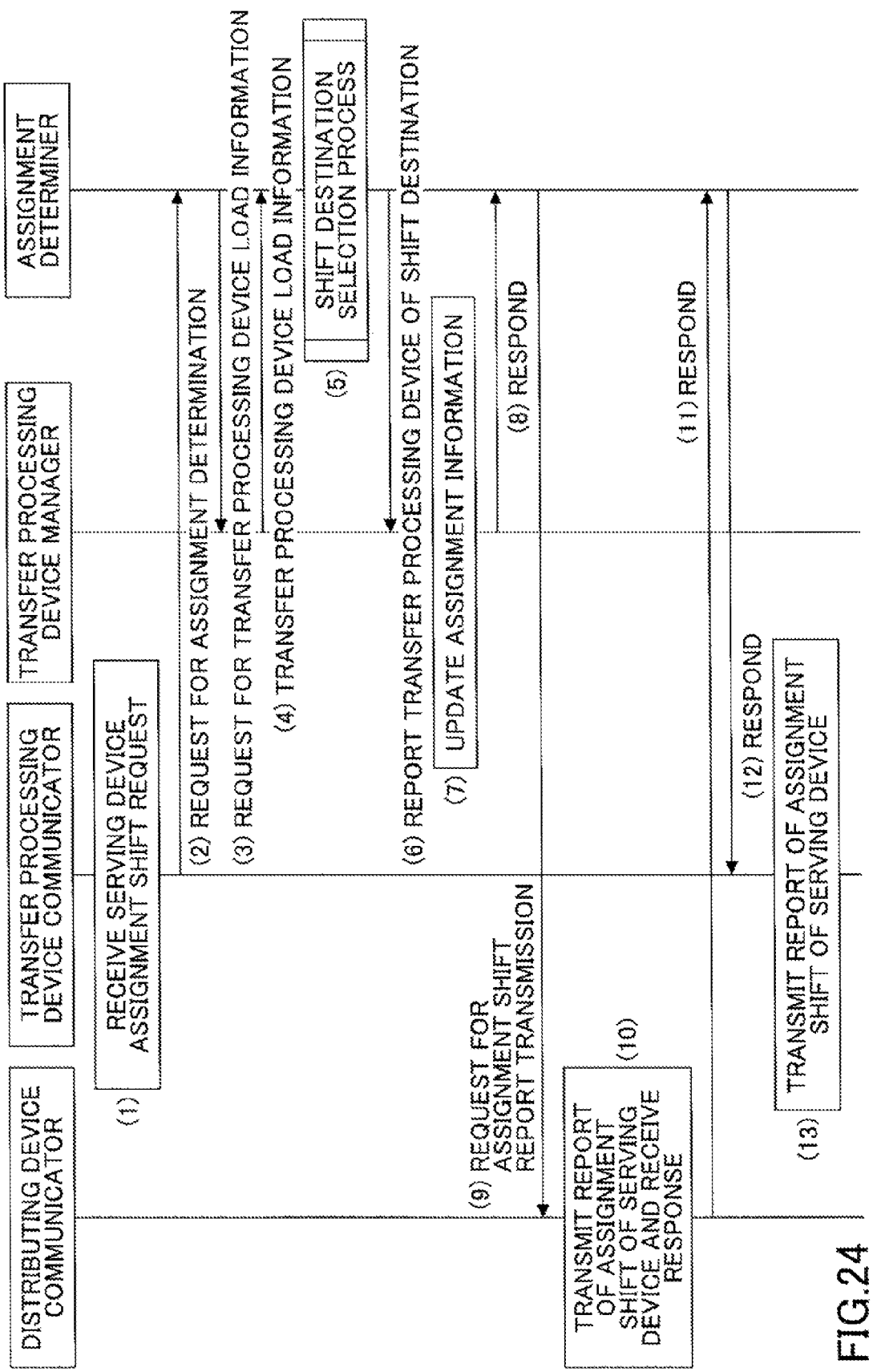
FIG. 24 illustrates an example processing sequence (a serving device assignment shift process) of the transfer management device.

FIG. 24 illustrates processes of shifting the assignment of the serving device 2 when the assignment shift request of the serving device 2 is received.

From the transfer processing device 4, the transfer processing device communicator 42 receives the IP address of one or more serving devices 2 and a request for shifting the assignment of the serving devices 2 to another transfer processing device 4 (1). The transfer processing device communicator 42 reports the IP address of the received serving devices 2 and the IP address of the transfer processing device 4 which is the transmission source of this request to the assignment determiner 45 (2). The assignment determiner 45 transmits a request for the load information of the transfer processing devices 4 other than the transfer processing device 4 which is the transmission source of this request to the transfer processing device manager 44 (3). The transfer processing device manager 44 refers to the transfer processing device management table 31, acquires the load information of the transfer processing devices 4, and transmits the acquired load information to the assignment determiner 45 (4).

Based on the load information of the transfer processing devices 4 received from the transfer processing device 4, the assignment determiner 45 performs a shift destination selection process to select the transfer processing devices 4 which becomes the shift destination of the assignment of the serving device 2 (5). Details of the shift destination selection process are described below with reference to FIG. 25. Further, the assignment determiner 45 reports the IP address of the transfer processing devices 4 which becomes the shift destination of the assignment of the determined serving device 2 to the transfer processing device manager 44 (6).

Based on the IP address of the transfer processing devices 4 reported from the assignment determiner 45, the transfer processing device manager 44 updates the assignment table 32 (7). Specifically, the transfer processing device manager 44 changes the IP address of the transfer processing device 4 corresponding to the IP address of one or more serving device 2 which are shift targets by using the IP address of the transfer processing devices 4 selected by the assignment determiner 45. Further, the transfer processing device manager 44 reports that the update process is completed to the assignment determiner 45 (8).

The assignment determiner 45 requests the distributing device communicator 43 to transmit a report that the assignment of the serving device 2 is shifted (9). The distributing device communicator 43 transmits the report that the assignment of the serving device 2 is shifted to the distributing device 6 (i.e., the distributing device communicator 43 transmits a change request of the distribution destination of the VM statistical information received from the serving device 2) (10). The IP address of the transfer processing devices 4 selected by the assignment determiner 45 and the session ID received from the transfer processing devices 4 are attached to this request.

Further, upon receiving the request, the distributing device 6 changes the IP address of the transfer processing devices 4 corresponding to the reported session ID in the data of the distribution destination table by using the IP address of the reported transfer processing devices 4 which is the shift destination. Then, the distributing device 6 transmits a response indicating that the change is completed to the transfer management device 5.

Upon receiving the response indicating the distribution destination is changed from the distributing device 6, the distributing device communicator 43 reports the content of the response from the distributing device 6 to the assignment determiner 45 (11).

The assignment determiner 45 reports the IP address of the transfer processing devices 4 selected by the assignment determiner 45 to the transfer processing device communicator 42, and further reports that the assignment change (shift) process of the serving device 2 is performed to the transfer processing device communicator 42 (12). The transfer processing device communicator 42 reports that the assignment shift process is completed to the transfer processing devices 4 which was the transfer source of the assignment of the serving device 2, and reports that the transfer process of the serving device 2 is assigned to the transfer processing devices 4 which becomes the shift destination of the assignment of the serving device 2 by using the IP address of the transfer processing devices 4 reported from the assignment determiner 45 (13).

Figure 25:
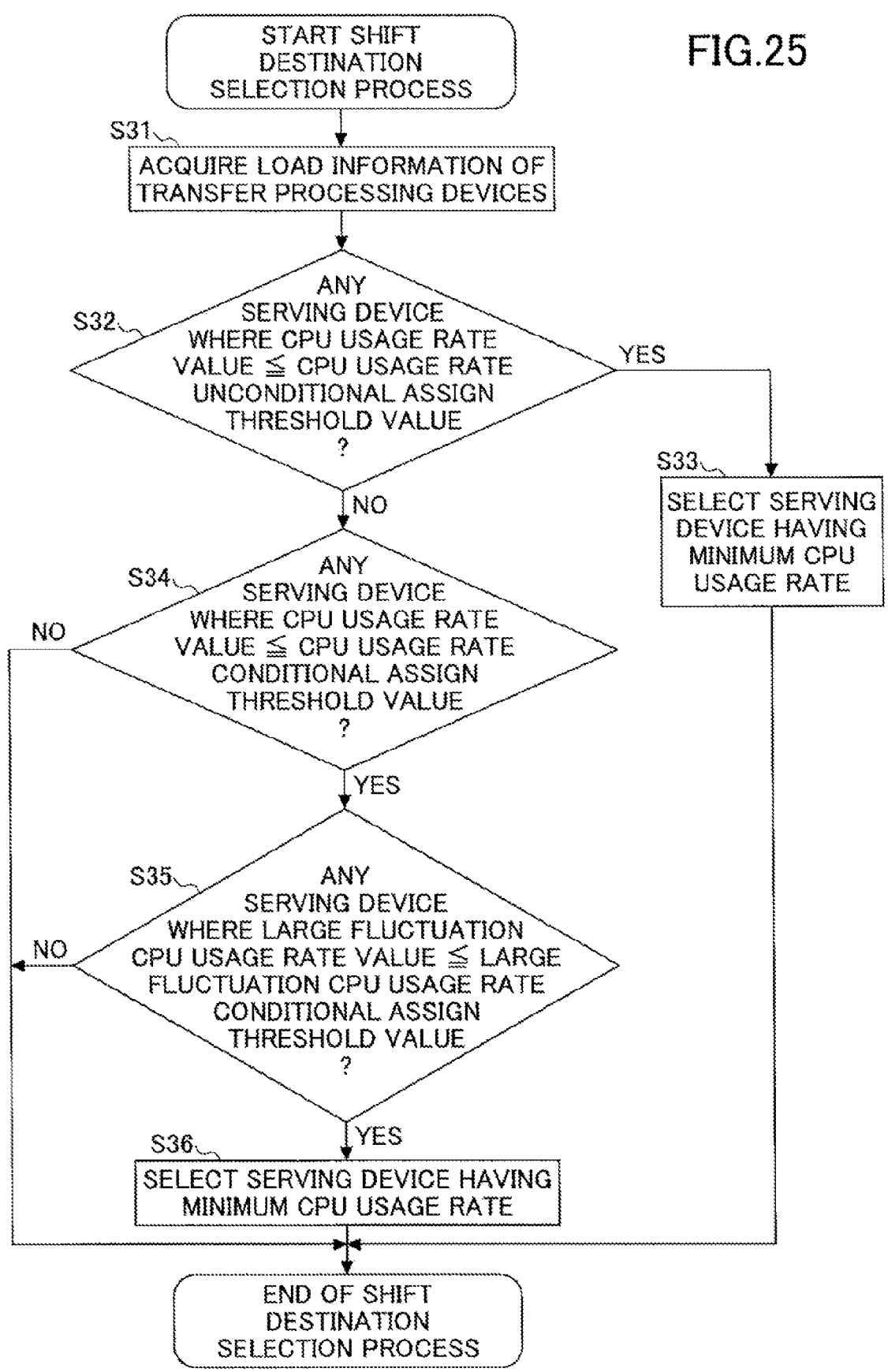
FIG. 25 is a flowchart illustrating an example shift destination selection process.

Herein, the shift destination selection process performed by the assignment determiner 45 of the transfer management device 5 is described with reference to the flowchart of FIG. 25.

The assignment determiner 45 receives the load information including the CPU usage rate and the large fluctuation CPU usage rate of the transfer processing devices 4 other than the transfer processing device 4 which is the transmission source of the assignment shift request of one or more serving devices 2 from the distributing device communicator 43 (step S31). Then, the assignment determiner 45 determines whether there is the transfer processing device 4 having the CPU usage rate equal to or less than the CPU usage rate unconditional assign threshold value set in the common information table 34 (step S32). When determining that there is the transfer processing device 4 having the CPU usage rate equal to or less than the CPU usage rate unconditional assign threshold value (YES in step S32), the assignment determiner 45 selects the transfer processing device 4 having the lowest CPU usage rate from among the transfer processing devices 4 having the CPU usage rate equal to or less than the CPU usage rate unconditional assign threshold value (step S33). A main purpose of this process of step S33 is to predominantly (preferably) assign the transfer process to the transfer processing device 4 which is newly introduced. On the other hand, when determining that there is no transfer processing device 4 having the CPU usage rate equal to or less than the CPU usage rate unconditional assign threshold value (NO in step S32), the assignment determiner 45 further determines whether there is the transfer processing device 4 having the CPU usage rate equal to or less than the CPU usage rate conditional assign threshold value set in the common information table 34 (step S34). When determining that there is the transfer processing device 4 having the CPU usage rate equal to or less than the CPU usage rate conditional assign threshold value (YES in step S34), the assignment determiner 45 further determines whether there is the transfer processing device 4 having the large fluctuation CPU usage rate equal to or less than the large fluctuation CPU usage rate threshold value set in the common information table 34 (step S35). When determining that there is the transfer processing device 4 having the large fluctuation CPU usage rate equal to or less than the large fluctuation CPU usage rate threshold value (YES in step S35), the assignment determiner 45 selects the transfer processing device 4 having the lowest large fluctuation CPU usage rate from among the transfer processing devices 4 having the large fluctuation CPU usage rate equal to or less than the large fluctuation CPU usage rate threshold value (step S36). By the process of step S36, it may become possible to select the transfer processing device 4 having a lower ratio (probability) of performing the transfer process having a larger fluctuation of the transfer amount (i.e., relatively stably operating transfer processing device 4). As a result, it may become possible to reduce the probability that the operation of the transfer processing device 4 which is the transfer destination will become unstable. On the other hand, in the determination of step S34, when determining that there is no transfer processing device 4 having the CPU usage rate equal to or less than the CPU usage rate conditional assign threshold value (NO in step S34), the process ends without selecting any transfer processing device 4 by the assignment determiner 45. By doing this, when there are only transfer processing devices 4 having a higher CPU usage rate, it may become possible not to perform the assignment shift process of the serving device 2. Similarly, in the determination in step S35, when determining that there is no transfer processing device 4 having the large fluctuation CPU usage rate equal to or less than the large fluctuation CPU usage rate threshold value (NO in step S35), the process ends without selecting any transfer processing device 4. By doing this, it may become possible not to perform the assignment shift process of the serving device 2 even when there are only transfer processing devices 4 having a relatively lower CPU usage rate but when the operations of those transfer processing devices 4 are unstable (i.e., when there are only transfer processing devices 4 having a probability of suddenly increasing the CPU usage rate). Further, when no transfer processing device 4 is selected and the process is terminated, for example, the error process may be performed.

Further, when there are two or more serving devices 2 which are the shift targets of the assignment, the assignment determiner 45 separately and repeatedly performs the shift destination selection process on the serving devices 2, and selects the transfer processing devices 4 which becomes the shift destinations of the assignments.

Further, when, for example, the system configuration information having the contents that a new serving device 2 is added is received from the VM management device 1 and the new serving device 2 is assigned to the transfer processing devices 4, the transfer management device 5 determines the transfer processing devices 4 which becomes the assignment destination not by the process of shifting the assignment of the serving devices 2 but by the same processes described above. Further, the transfer management device 5 updates the assignment table 32 based on the changes in the above process, and reports that the serving device 2 is assigned to the transfer processing devices 4. Further, when, for example, the serving devices 2 is deleted (removed) from the system, the transfer management device 5 updates the assignment table 32 based on the change, and reports that the serving devices 2 is deleted (removed) to the transfer processing devices 4 to which the serving devices 2 is assigned. Further, when, for example, there is a change in the collecting device 3 which becomes the transfer destination of the VM statistical information of the VM configured in the serving devices 2 assigned to the transfer processing devices 4, the transfer management device 5 updates the transfer destination table 33 based on the change, and reports the change of the collecting device 3 to the transfer processing devices 4 assigned to the serving device 2.

By the processes of the transfer processing devices 4 and the transfer management device 5, the following functions and effects may be obtained.

Namely, when the assignment of the serving device 2 is transferred to another serving device 2, the serving device manager 22 of the transfer processing devices 4 changes the shift status of the serving device management table 11 depending on the reception state of the VM statistical information from the serving device 2. Further, depending on the shift status, the shift target determiner 23 determines the serving device 2 which becomes the shift target. Therefore, the shift target determiner 23 may determine an appropriate serving device 2 based on the status (conditions) of the serving devices 2. As a result, it may become possible to effectively use the information processing resources of a plurality of transfer processing devices 4 as a whole system, and effectively perform the transfer process of data.

Herein, according to the processes in the transfer processing device 4, the time (timing) when the next VM statistical information is received is estimated for each of the serving devices 2, and the time (timing) when the assignment shift process in the distributing device 6 is completed is estimated. Further, the serving device 2 in which the time to receive the VM statistical information is later than the time to complete the assignment shift process and having the estimated time to receive data closer to the shift completion estimated time than any other serving devices 2 is selected as the shift target. Therefore, it may become possible to reduce the probability of an occurrence where the reception of the VM statistical information from the serving device 2 which is determined as the shift target starts before the assignment shift is completed. Further, the transfer process of data may be promptly shifted to another device which is the transfer source. Therefore, it may become possible to promptly reduce the load of the device of the transfer source. Further, this function may be realized regardless of whether the change process of the shift status is performed.

For example, a case in which an operation environment is considered where there are X serving devices 2, and each of the serving devices 2 transmits the VM statistical information every thirty seconds, and the shift time of the assignment shift process of the serving devices 2 is one second. In this case, when any of the serving devices 2 is simply selected as the shift target, there may occur a situation where the reception of the VM statistical information from the serving device 2 which is determined as the shift target starts before the assignment shift process is completed at the rate of $(1/X)*(X/30) = 1/30$ (approximately 3.2%). However, by performing the processes of the transfer processing device 4, the probability of the above occurrence may be reduced to almost zero.

Figure 26:
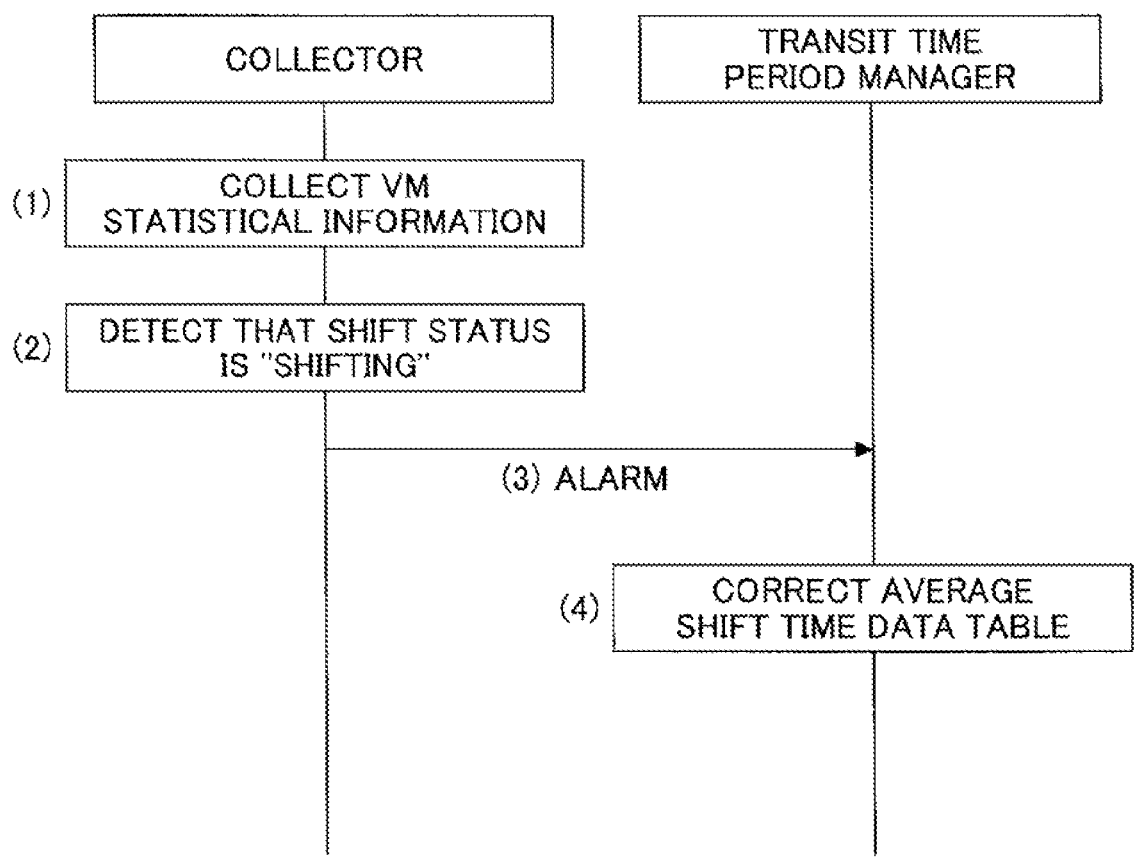
FIG. 26 illustrates an example processing sequence when an average shift time data are corrected.

Herein, if the reception of the VM statistical information from the serving device 2 determined as the shift target starts before the shift process is completed even when the above described processes are performed, the transfer processing device 4 may set a longer value in the average shift time data table 16. This process is illustrated in FIG. 26. Specifically, in the periodical collecting process of collecting the VM statistical information, the collector 26 receives the VM statistical information from the serving device 2 (1). This process corresponds to the process (1) in FIG. 18. Further, the collector 26 refers to the shift status of the serving device 2 which is the transmission source of the VM statistical information in the serving device management table 11. When the collector 26 specifies the shift status as "shifting" (2), the collector 26 issues an alarm to the shift time period manager 25 (3). On the other hand, upon receiving the alarm, the shift time period manager 25 change the time (data) in the average shift time data table 16 using a longer value (4). By doing this, the time (timing) estimated as the time when the transfer process of the assignment of the serving device 2 in step S12 of FIG. 21 is delayed. Therefore, during the shifting process of the assignment of the serving device 2 in the next time, the serving device 2 in which the reception of the next shift target data is delayed may be selected. Therefore, it may become possible to reduce the probability in which the reception of the VM statistical information from the serving device 2 which is determined as the shift target starts before the completion of the transfer process. Further, when determining how much the time period (data) of the average shift time data table 16 is increased, any appropriate method may be used. For example, a predetermined time may be set as a fixed value in the storage in advance, and the data of the average shift time data table 16 may be increased by the predetermined time. Further, when the average shift time period tends to be longer as a whole, the update coefficient used for calculating the average transfer time may be increased so as to more accurately reflect new transfer time without directly changing the average shift time period of the average shift time data table 16.

On the other hand, according to the processes of the transfer management device 5, in the assignment shift process of the serving device 2, an appropriate serving device 2 may be selected in the transfer processing device 4 and further, an appropriate transfer processing device 4 which becomes the shift destination may be selected. Specifically, the transfer management device 5 periodically receives the load information of the transfer processing devices 4 and stores the load information into the transfer processing device management table 31. Further, based on the load information, the transfer processing devices 4 which becomes the shift destination is selected. In this case, the transfer management device 5 may select the transfer processing devices 4 which operates relatively stably by referring not only to the CPU usage rate but also to the large fluctuation CPU usage rate of the transfer processing devices 4 to select the transfer processing devices 4 having the large fluctuation CPU usage rate equal to or less than the large fluctuation CPU usage rate threshold value.

In the above embodiment, the serving device 2 which is to be the shift target is selected in the transfer processing device 4. However, for example, the transfer management device 5 may perform processes including the process of selecting the serving device 2. Namely, the transfer processing device 4 may report the contents of the serving device management table 11 and the common information table 13 to the transfer management device 5, so that the transfer management device 5 may select the serving device 2 which is to be the shift target of the assignment based on the report.

Further, in the system configuration excluding the transfer management device 5, the transfer processing device 4 may shift the assignment of the serving device 2 related to the transfer process performed by the transfer processing device 4 to another transfer processing device 4. In this case as well, the transfer processing device 4 may have a configuration to select the serving device 2 of the shift target.

Further, the system configuration in which the VM statistical information is distributed by using the distributing device 6 is an example only. For example, the serving device 2 may directly transmit the VM statistical information to the transfer processing device 4. In this case, the transmission destination of the VM statistical information may be directly set to the transfer processing device 4 and managed. Further, the transfer management device 5 may transmit the assignment shift report to the serving device 2 and the serving device 2 may change the setting of the transmission destination of the VM statistical information in the serving device 2.

[Hardware Configuration]

Figure 27:
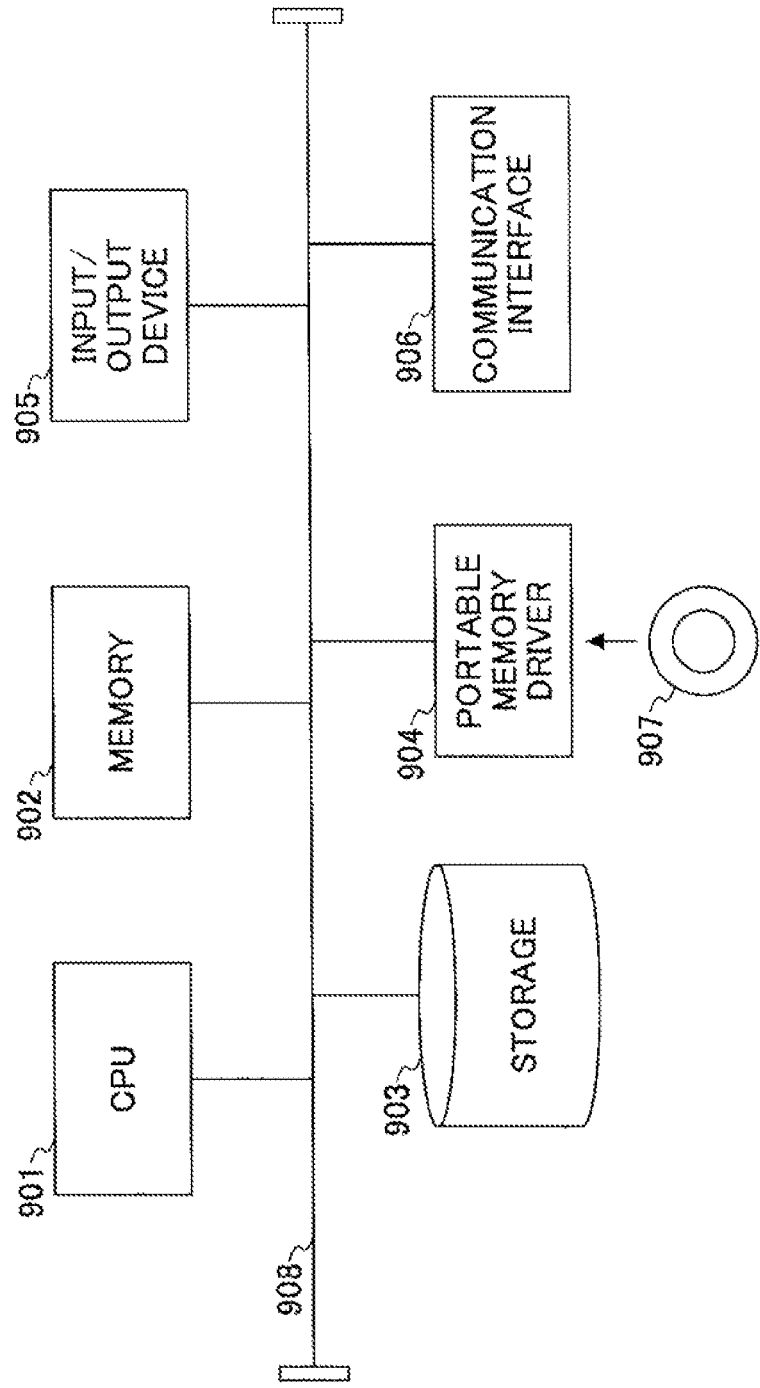
FIG. 27 illustrates an example hardware configuration of the transfer processing device and the transfer management device.

FIG. 27 illustrates an example hardware configuration of the transfer processing device 4 and the transfer management device 5 where the above described technique (method) may be realized. Those devices include the a CPU 901, a memory 902, a storage 903, a portable memory driver 904, an input/output device 905, and a communication interface 906.

The CPU 901 includes a control unit, a calculation unit, a command decoder, an execution unit and the like. Based on the commands of the program decoded by the command decoder, and in response to the control signals output from the control unit, performs the arithmetic and logical calculations by using the calculation unit. The CPU 901 may includes a plurality of CPU cores.

The memory 902 may be, for example, a RAM (Random Access Memory) or the like to which the program to be executed by the CPU is loaded. Further, the memory 902 is a main memory where data used in the process of the CPU 901 are stored. The storage 903 may be an HDD (Hard Disk Drive) or a flash memory where the program and various data are stored. The portable memory driver 904 reads the data and program stored in a portable storage medium 907. The portable storage medium 907 may be, for example, a magnetic disk, an optical disk, an optical magnetic disk, a flash memory or the like. Further, the physical CPU 901 collaborates with the memory 902 and the storage 903, and executes the program stored in the storage 903 and the portable storage medium 907. The program executed by the physical CPU 901 and the data to be accessed may be stored in other device communicable to this device.

The input/output device 905 may be, for example, a keyboard and a display which accepts operation commands by user's operations and outputs the processing results of the information processing device. The communication interface 906 may be, for example, a LAN card, which enables external data communications. Those elements of the devices are connected via a bus 908.

The functional configuration and a physical configuration of the information processing device are not limited to the configurations describe above. For example, some of the elements of the physical resources may be integrated, or any of the elements may be further distributed.

According to an embodiment, it may become possible to improve the processing efficiency due to the load distribution of data in the entire system.

An object of the present invention is to improve the processing efficiency of the entire system in the load distribution of the shift process by selecting an appropriate transfer source device as a shift target.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiment of the present inventions has been described in detail, it is to be understood that various changes, substitutions, and alterations could be made hereto without departing from the sprit and scope of the invention.

What is claimed is:

1. A non-transitory recording medium storing a computer-readable program, the computer-readable program causing a transfer processing device, configured to transfer data transmitted every predetermined time period from a plurality of transfer source devices to corresponding transfer destination devices, to execute:

calculating a reception estimated time when the data are to be received based on a last reception time of the data and a reception time interval of the data for each of the plurality of the transfer source devices;

calculating a shift completion estimated time based on a shift time period which is necessary to shift an assignment of a data transfer process of a transfer source device included in the plurality of the transfer source devices from the transfer processing device to another transfer processing device; and shifting the assignment of the data transfer process from the transfer processing device to the another transfer processing device, the assignment of the data transfer process being relevant to a transfer source device having the calculated reception estimated time later than the shift completion estimated time and closer to the shift completion estimated time than any other transfer source devices.

2. The non-transitory recording medium according to claim 1, wherein, in the shifting, the assignment of the data transfer process is transferred from the transfer processing device to the another transfer processing device, and the data transfer process is relevant to a transfer source device having a transfer amount of the data greater than that of any other transfer source devices from among the transfer source devices having the calculated reception estimated time later than the shift completion estimated time and closer to the shift completion estimated time than any other transfer source devices.

3. The non-transitory recording medium according to claim 1, storing the computer-readable program causing the transfer processing device to further execute:

calculating, when the data are received from any of the plurality of the transfer source devices, a differential time between a reception time of the data and the last reception time stored when previous data is received;

calculating the reception time interval of the data based on the differential time; and storing the reception time interval into a storage.

4. The non-transitory recording medium according to claim 3, storing the computer-readable program causing the transfer processing device to further execute:

calculating, after calculating the reception time interval, a value indicating a fluctuation of the reception time interval; and storing the value indicating the fluctuation into the storage, wherein, in the shifting, the assignment of the data transfer process is transferred from the transfer processing device to the another transfer processing device, and the data transfer process is relevant to a transfer source device having the value indicating the fluctuation less than that of any other transfer source devices from among the transfer source devices having the calculated reception estimated time later than the shift completion estimated time and closer to the shift completion estimated time than any other transfer source devices.

5. The non-transitory recording medium according to claim 1, storing the computer-readable program causing the transfer processing device to further execute:

measuring a time period necessary for the assignment;

calculating the shift time period based on the time period; and storing the shift time period into a storage.

6. The non-transitory recording medium according to claim 1, storing the computer-readable program causing the transfer processing device to further execute:

correcting and updating the shift time period stored in the storage when the data are received from the transfer source device relevant to the data transfer process in the data shift process.

7. The non-transitory recording medium according to claim 1, storing the computer-readable program causing the transfer processing device to further execute:

storing, when the data are received from any of the plurality of the transfer source devices, a history of a transfer amount of the received data; and setting an information item indicating whether it is possible to perform the data transfer process relevant to the transfer source device to unable when determining that a value indicating the transfer amount of the received data in the history exceeds a predetermined amount.

8. The non-transitory recording medium according to claim 1 wherein, in the shifting, the assignment of the data transfer process is transferred from the transfer source device to the another transfer source device, and the data transfer process is performed on the assignment of a plurality of the transfer source devices so that a total transfer amount of the data of the plurality of the transfer source devices is equal to or greater than a predetermined amount from among the transfer source devices having the calculated reception estimated time later than the shift completion estimated time and closer to the shift completion estimated time than any other transfer source devices.

9. The non-transitory recording medium according to claim 1 wherein, in the shifting, the assignment of the data transfer process is transferred from the transfer source device to the another transfer source device, and the data transfer process is performed on the assignment of a transfer source device having a transfer amount less than that of any other transfer source devices from among the transfer source devices having the calculated reception estimated time later than the shift completion estimated time and closer to the shift completion estimated time than any other transfer source devices.

10. The non-transitory recording medium according to claim 1 wherein, in the shifting, the assignment of the data transfer process is transferred from the transfer source device to the another transfer source device, the assignment of the data transfer process is relevant to a transfer source device having the calculated reception estimated time later than the shift completion estimated time and closest to the shift completion estimated time among the plurality of the transfer source devices.

11. A non-transitory recording medium storing a computer-readable program, the computer-readable program causing a transfer management device, included in a system including a plurality of transfer processing devices and one or more transfer management devices, the transfer processing devices transferring data transmitted every predetermined time period from a plurality of transfer source devices to corresponding transfer destination devices, to execute:

calculating a reception estimated time when the data are to be received based on a last reception time of the data and a reception time interval of the data for each of the plurality of the transfer source devices;

calculating a shift completion estimated time based on a shift time period which is necessary to shift an assignment of a data transfer process of a transfer source device of the plurality of the transfer source devices from the transfer processing device to another transfer processing device; and transferring the assignment of the data transfer process from the transfer processing device to the another transfer processing device, the assignment of the data transfer process being relevant to a transfer source device having the calculated reception estimated time later than the shift completion estimated time and closer to the shift completion estimated time than any other transfer source devices.

12. A transfer processing device transferring data transmitted every predetermined time period from a plurality of transfer source devices to corresponding transfer destination devices, the transfer processing device comprising:

a first calculator configured to calculate a reception estimated time when the data are to be received based on a last reception time of the data and a reception time interval of the data for each of the plurality of the transfer source devices;

a second calculator configured to calculate a shift completion estimated time based on a shift time period which is necessary to shift an assignment of a data transfer process of a first transfer source device of the plurality of the transfer source devices from the transfer processing device to another transfer processing device; and a shift unit configured to shift the assignment of the data transfer process from the transfer processing device to the another transfer processing device, the assignment of the data transfer process being relevant to a transfer source device having the calculated reception estimated time later than the shift completion estimated time and closer to the shift completion estimated time than any other transfer source devices.

13. An information processing method for a transfer processing device transferring data transmitted every predetermined time period from a plurality of transfer source devices to corresponding transfer destination devices, the information processing method comprising:

calculating a reception estimated time when the data are to be received based on a last reception time of the data and a reception time interval of the data for each of the plurality of the transfer source devices;

calculating a shift completion estimated time based on a shift time period which is necessary to shift an assignment of a data transfer process of a transfer source device of the plurality of the transfer source devices from the transfer processing device to another transfer processing device; and transferring the assignment of the data transfer process from the transfer processing device to the another transfer processing device, the assignment of the data transfer process being relevant to a transfer source device having the calculated reception estimated time later than the shift completion estimated time and closer to the shift completion estimated time than any other transfer source devices.

* * * * *